(12) United States Patent
Arike et al.

(10) Patent No.: US 11,360,251 B2
(45) Date of Patent: Jun. 14, 2022

(54) FILM AND LAYERED BODY HAVING SPECIFIED THICKNESS RATIOS OF THERMOPLASTIC LAYERS

(71) Applicant: Toray Industries, Inc., Tokyo (JP)

(72) Inventors: Takafumi Arike, Otsu (JP); Yoshihiro Masuda, Otsu (JP); Shigeru Aoyama, Otsu (JP)

(73) Assignee: Toray Industries, Inc., Tokyo (JP)

( * ) Notice: Subject to any disclaimer, the term of this patent is extended or adjusted under 35 U.S.C. 154(b) by 711 days.

(21) Appl. No.: 16/316,106

(22) PCT Filed: Jun. 23, 2017

(86) PCT No.: PCT/JP2017/023202
§ 371 (c)(1),
(2) Date: Jan. 8, 2019

(87) PCT Pub. No.: WO2018/012252
PCT Pub. Date: Jan. 18, 2018

(65) Prior Publication Data
US 2021/0278578 A1 Sep. 9, 2021

(30) Foreign Application Priority Data

Jul. 15, 2016 (JP) .............................. JP2016-139956
Dec. 7, 2016 (JP) .............................. JP2016-237298
Feb. 6, 2017 (JP) .............................. JP2017-019243

(51) Int. Cl.
| | |
|---|---|
| *B32B 27/08* | (2006.01) |
| *G02B 1/14* | (2015.01) |
| *G02B 5/26* | (2006.01) |
| *G02B 5/28* | (2006.01) |
| *G02B 5/08* | (2006.01) |
| *G02B 5/20* | (2006.01) |
| *B32B 27/00* | (2006.01) |

(52) U.S. Cl.
CPC .............. *G02B 5/26* (2013.01); *B32B 27/08* (2013.01); *G02B 1/14* (2015.01); *G02B 5/0841* (2013.01);
(Continued)

(58) Field of Classification Search
CPC .............. B32B 17/10633; B32B 27/08; B32B 2307/42; G02B 1/14; G02B 5/0841;
(Continued)

(56) References Cited

U.S. PATENT DOCUMENTS

| | | |
|---|---|---|
| 5,360,659 A | 11/1994 | Arends et al. |
| 7,494,702 B2 | 2/2009 | Oya |

(Continued)

FOREIGN PATENT DOCUMENTS

| | | |
|---|---|---|
| JP | 3901911 B2 | 4/2007 |
| JP | 2007307893 A | 11/2007 |

(Continued)

OTHER PUBLICATIONS

International Search Report and Written Opinion for International Application No. PCT/JP2017/023202, dated Sep. 19, 2017—7 pages.

*Primary Examiner* — Ryan S Dunning
(74) *Attorney, Agent, or Firm* — RatnerPrestia

(57) ABSTRACT

The present invention is a film having at least one reflection band in which the reflectance is 30% or greater continuously in at least a 100-nm range in a wavelength range of 1200-1800 nm when light is incident from at least one side, the mean transmittance in a wavelength range of 430-600 nm is 70% or greater, and the average value of the axial rigidity of the film in the principal orientation axis direction of the film and in the direction orthogonal thereto is 45 N/m or less.

18 Claims, 17 Drawing Sheets

(52) U.S. Cl.
CPC ............. *G02B 5/208* (2013.01); *G02B 5/282* (2013.01); *G02B 5/285* (2013.01); *G02B 5/287* (2013.01); *B32B 27/00* (2013.01)

(58) Field of Classification Search
CPC ........ G02B 5/208; G02B 5/223; G02B 5/226; G02B 5/26; G02B 5/28; G02B 5/281; G02B 5/282; G02B 5/285; G02B 5/286; G02B 5/287

See application file for complete search history.

(56) References Cited

U.S. PATENT DOCUMENTS

| | | | |
|---|---|---|---|
| 8,029,909 B2 | 10/2011 | Osada et al. | |
| 2003/0176124 A1* | 9/2003 | Koike | B32B 27/08 442/16 |
| 2004/0240093 A1* | 12/2004 | Yoshikawa | G02B 5/282 359/883 |
| 2015/0177433 A1* | 6/2015 | Kumagai | G02B 1/14 359/359 |
| 2015/0192718 A1 | 7/2015 | Saito et al. | |

FOREIGN PATENT DOCUMENTS

| | | |
|---|---|---|
| JP | 4310312 B2 | 8/2009 |
| JP | 2010017854 A | 1/2010 |
| JP | 2014228837 A | 12/2014 |
| WO | 2005095097 A1 | 10/2005 |
| WO | 2014010532 A1 | 1/2014 |
| WO | 2016006388 A1 | 1/2016 |

* cited by examiner

FILM AND LAYERED BODY HAVING SPECIFIED THICKNESS RATIOS OF THERMOPLASTIC LAYERS

CROSS REFERENCE TO RELATED APPLICATIONS

This is the U.S. National Phase application of PCT/JP2017/023202, filed Jun. 23, 2017, which claims priority to Japanese Patent Application No. 2016-139956, filed Jul. 15, 2016, Japanese Patent Application No. 2016-237298, filed Dec. 7, 2016, and Japanese Patent Application No. 2017-019243, filed Feb. 6, 2017, the disclosures of each of these applications being incorporated herein by reference in their entireties for all purposes.

FIELD OF THE INVENTION

The present invention relates to a film and a layered body.

BACKGROUND OF THE INVENTION

In recent years, attention has been drawn to the application of heat-shielding glass that can reduce the inflow of external heat in the summer, heat of sunlight in particular, to vehicles such as automobiles and electric trains, and window panes of buildings, under the regulation of emission of carbon dioxide for environmental protection.

Techniques to produce such heat-shielding glass include, for example, the addition of a heat absorbing agent to an interlayer film incorporated in glass or laminated glass to ensure shielding of heat by the heat absorbing agent (for example, Patent document 1), the formation of a metal film on the surface of glass by sputtering so that heat is reflected to achieve its shielding (for example, Patent document 2), and the use of a multi-layer polymer film consisting of alternately stacked polymer layers with different refractive indices, which is inserted between a glass layer and an interlayer film so that heat is reflected to achieve its shielding (for example, Patent document 3).

PATENT DOCUMENTS

Patent document 1: Japanese Unexamined Patent Publication (Kokai) No. 2010-17854
Patent document 2: Japanese Patent No. 3901911
Patent document 3: Japanese Patent No. 4310312
Patent document 4: International Publication WO 2005/095097
Patent document 5: U.S. Pat. No. 5,360,659

SUMMARY OF THE INVENTION

In the case of the method that uses a heat absorbing agent described in Patent document 1, solar light coming from the outside is converted into thermal energy, and accordingly, there is a disadvantage that the heat may be radiated into the room to cause a decrease in the heat shield efficiency. In addition, the absorption of heat may cause an increase in the glass temperature, possibly leading to damage to the glass plate due to the difference from the outside air temperature. In the case of the method that uses a metal film formed on the surface of glass by sputtering described in Patent document 2, not only heat but also electromagnetic waves are shielded, possibly making communications devices unable to work appropriately in automobiles, buildings, or the like.

Compared to these, in the case of the method that uses a multi-layer polymer film described in Patent document 3, only light of a specific wavelength can be selected for reflection by controlling the film thickness, and accordingly, it will be possible to allow light in the near infrared region to be reflected selectively so that the heat shield performance is improved while maintaining a high transmittance for visible light. Furthermore, it will maintain a high radio wave permeability because it is free of metals or other substances that shut off radio waves. For multi-layered polymer films, known good layer constitutions to permit selective light reflection include, for example, those as represented by Equation (1) given below as described in Patent document 4.

[Formula 1]

$$\lambda/m = 2(n_A d_A + n_B d_B) \quad (1)$$

In this case, the m'th order interference reflection occurs at a wavelength of $\lambda/m$ (m is a natural number) in addition to the one at the intended reflection wavelength (primary reflection wavelength $\lambda$). Therefore, if a layer thickness is controlled, for example, so that the primary reflection wavelength (first order) will occur in the wavelength range of 1,200 nm or more, then the third order interference reflection will also occur in the visible light region of 400 nm or more. In this case, such a film has the disadvantage of being unable to work appropriately in such members as automobile windshield that need high transparency.

Known methods to reduce high order reflections include the adoption of a layer constitution having a layer thickness ratio of 1:7:1 (a layer constitution called the 711 constitution) as described in Patent document 5. However, it has been revealed in studies carried out by the present inventors that multi-layered laminated films having this 711 constitution are lower in reflectance than those having a layer constitution as described in Patent document 4, leading to the problem of requiring a larger number of layers and accordingly higher equipment cost to achieve an intended reflectance. Furthermore, an increase in the number of layers will lead to an increase in the film thickness. An increase in the film thickness will lead to an increase in the rigidity of the film, and accordingly, it will be impossible to paste the film on a glass plate with a high curvature because of being unable to conform smoothly to the shape of the glass. Even if it can be pasted, it will be peeled off easily by wind or vibration. This problem is surfacing particularly in recent years because glass plates with high curvatures are now in wider use to meet design requirements.

Specifically, in the case of a layer design as described in Patent document 4, an effort at improving the reflectance in the near infrared region while maintaining a high transmittance in the visible light range will place a wavelength limit at 1,200 nm, above which a high reflectance cannot be ensured. On the other hand, although the 711 constitution described in Patent document 5 can achieve a high transmittance in the visible light range while ensuring reflection in a reflection band in the wavelength range of 1,200 nm or more, a larger number of layers are necessary and the film will become thicker to ensure a high reflectance, making it impossible to paste the film on a glass plate with a high curvature.

To solve these problems, the present invention provides a film having at least one reflection band where a reflectance of 30% or more is maintained over a continuous part covering 100 nm or more in the wavelength range of 1,200 to 1,800 nm for incident light at least entering from one side, having an average transmittance of 70% or more over the wavelength range of 430 to 600 nm, and having an average axial rigidity between the main orientation axis direction and the direction perpendicular thereto of 10 N/m or more and 45 N/m or less.

The present invention can provide a film having an enlarged reflection band range while maintaining a high reflectance and having an increased transmittance for visible light. With a small axial rigidity, the film can be pasted easily on a glass surface with a high curvature.

DETAILED DESCRIPTION OF EMBODIMENTS OF THE INVENTION

Figure 1:
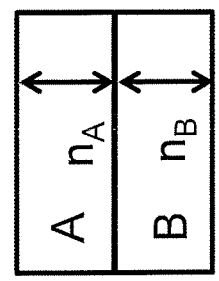
FIG. 1 shows a conceptual scheme of lamination unit 1.

Preferred embodiments of the present invention will be illustrated below, but it should be understood that the invention is not construed as being limited to these embodiments including the Examples given below and, as a matter of course, various changes may be made as long as meeting any object of the invention and unless going beyond the scope of the claims of the invention.

It is essential for the film according to the present invention to have at least one reflection band where a reflectance of 30% or more is maintained over a continuous region covering 100 nm or more in the wavelength range of 1,200 to 1,800 nm for incident light at least entering from one side and have an average transmittance of 70% or more over the wavelength range of 430 to 600 nm. The reflectance in the wavelength range of 1,200 to 1,800 nm is more preferably 50% or more, and still more preferably 70% or more. The above expression "to have at least one reflection band where a reflectance of 30% or more is maintained" means that there exists a reflection band where a reflectance of 30% or more is maintained continuously over a region covering 100 nm or more. The size of the reflection band where a reflectance of 30% or more is maintained is more preferably 200 nm or more, and still more preferably 300 nm or more. If light in the wavelength range of 1,200 to 1,800 nm is reflected, 12% of the total sunlight energy will be shut out. However, if interference of light is applied to cause reflection of light in the range of 1,200 to 1,800 nm, high order reflection will occur near ½ or ⅓ of its wavelength, leading to a decrease in light transmittance in the visible range. To improve the light transmittance in the visible range, it is necessary to maintain an average transmittance of 70% or more, preferably 80% or more, in the wavelength range 430 to 600 nm. To improve the average transmittance in the wavelength range of 430 to 600 nm, it is necessary to adopt a layer design that can depress high order reflections.

In addition, it is necessary for the average axial rigidity between the main orientation axis direction of the film and the direction perpendicular thereto to be 10 N/m or more and 45 N/m or less. The main orientation axis referred to herein extends in a film's in-plane direction where the measured refractive index is highest, compared to other refractive index measurements. The axial rigidity, furthermore, is defined as the product of the Young's modulus and the cross section of the film. A high axial rigidity is not desirable because it leads to a deterioration in the conformity of the pasted film to a glass surface with a large curvature, for example, automobile windshields and other similar glass plates with large curvatures. The average axial rigidity should be no more than 45 N/m, preferably 40 N/m or less, and more preferably 35 N/m or less. If the axial rigidity is too low, on the other hand, the film itself will be brittle, leading to deterioration in handleability. Accordingly, the axial rigidity is preferably 10 N/m or more, more preferably 15 N/m or more, and still more preferably 20 N/m or more.

Furthermore, at least for incident light coming through either surface, it is also preferable for the average transmittance in the wavelength range of 400 to 800 nm to be 80% or more. A value in this this range allows the film to be high in transparency, and accordingly, a high transparency can be maintained easily even if there is a layer containing a heat ray absorbent. Therefore, the film can be combined with various types of heat ray absorbents and it is allowed to have a large thickness, leading to a high heat shield performance.

It is preferable for the film according to the present invention to have an average reflectance in the wavelength range of 900 to 1400 nm of 70% or more. For example, light in the wavelength range of 900 to 1,200 nm (light in the wavelength range of 900 to 1,200 nm accounts for about 18% of the total intensity of sunlight), which is somewhat higher than the visible light range, is reflected, it will be possible to obtain a film having both a high transparency and a high heat ray shielding performance. If sunlight can be reflected over a wider reflection band, for example in the wavelength range of 900 to 1400 nm, it will be possible to produce a film that can cut off 22% of the total intensity of sunlight. The major part of the intensity distribution of sunlight is within the visible light region, and the intensity distribution tends to decrease with an increasing wavelength. To provide a film to be applied to uses where high transparency is required, light in the wavelength range of 900 to 1,400 nm, which is somewhat higher than the visible light range, should be reflected efficiently to allow the film to have high heat ray shielding performance, and a widened reflection band can ensure a rate of acquisition of solar radiation heat of 70% or less as specified in ISO9050.

Furthermore, it is also preferable for the average reflectance in the wavelength range of 900 to 1,800 nm to be 70% or more. An increase in the reflection band to cover the wavelength range of 900 to 1,800 nm will serve to shut off about 29% of sunlight, making it possible to produce a film that can shut off about 99% of light in the wavelength range of 900 nm or more to ensure a still lower rate of acquisition of solar radiation heat. A larger average reflectance can be achieved by using two or more resins of different optical characteristics that significantly differ in in-plane refractive index, and in the case of using biaxially stretched films, it is preferable therefore to use a multi-layered laminated film in which layers of polyester resin, which is crystalline, and layers of a copolyester with a low refractive index that maintains an amorphous state while being stretched or that is melted in the heat treatment step are stacked alternately. To obtain a still larger average reflectance, the generally used method is to increase the number of layers; but this leads to an increase in film thickness, an increase in film's axial rigidity, and a deterioration in handleability, and therefore, it is necessary to adopt an appropriate number. For the present invention in particular, films are designed so that the thickness is minimized by adopting an appropriate ratio between lamination unit 1 and lamination unit 2, which will be described later.

It is preferable for the film according to the present invention to have both lamination unit 1 in which layers (A-layers) containing thermoplastic resin A as primary component and layers (B-layers) containing thermoplastic resin B as primary component stacked alternately to meet requirement (i) described below and lamination unit 2 in which layers (C-layers) containing thermoplastic resin C as primary component and layers (D-layers) containing thermoplastic resin D as primary component stacked alternately to meet requirement (ii) described below:
(i) Any A-layer and a B-layer located adjacent to each other have a thickness ratio (thickness of A-layer/thickness of B-layer) of 0.7 or more and 1.4 or less, and
(ii) Compared to the thinnest layer (having a thickness ratio of 1) of any set of three layers located adjacent to each other, one of the other two layer has a thickness ratio of 1.0 or more and 1.4 or less while the remaining layer has a thickness ratio of 5 or more and 9 or less.

Here, it is preferable that thermoplastic resin A and thermoplastic resin C are the same type of resin and thermoplastic resin B and thermoplastic resin D are the same type of resin. It is also good that either only thermoplastic resins A and C are the same type of resin or only thermoplastic resins B and D are the same type of resin. It is essential that thermoplastic resin A differs optically from thermoplastic resin B and thermoplastic resin C differs optically from thermoplastic resin D. The expression "to differ optically" means that the refractive index differs by 0.01 or more between any two of the following directions: any two randomly selected in-plane directions that are perpendicular to each other and the direction perpendicular to the plane. The expression "to be stacked alternately" means that layers of different resins are stacked in the thickness direction in a regular manner. For example, in the case of layers of two resins that differ optically, namely layers of polyester resin A and polyester resin B that are referred to as A-layers and B-layers, respectively, these layers are stacked in a regular manner such as A(BA)n (n denotes a natural number). If layers of different resins that differ optically are stacked alternately, it will be possible to allow them to reflect light in a specific wavelength range by adopting an appropriate relation among differences in refractive index between these layers and the thicknesses of the layers. Furthermore, as the total number of layers increases, it will be possible to achieve a high reflectance over a wider band. For the film according to the present invention, the total number of layers is preferably 51 or more, more preferably 201 or more. The interference reflection described above serves to achieve a high reflectance over a wider wavelength range with an increasing number of layers, making it possible to produce a film having a higher light shielding performance. Although there are no specific upper limit to the number of layers, deterioration in handleability occurs due to an increase in film thickness and an increase in production cost that results from production equipment that becomes larger with an increasing number of layers, and realistically therefore, the practical upper limit is 1,000 for each layer type.

Here, for aforementioned lamination unit 1 (see FIG. 1), the optical thicknesses of mutually adjacent A-layer and B-layer preferably meet both equations (1) and (2) given below:

[Formula 2]

$$\lambda/m = 2(n_A d_A + n_B d_B) \quad (1)$$

[Formula 3]

$$n_A d_A = n_B d_B \quad (2)$$

Here, $\lambda$ is the reflection wavelength, $n_A$ is the in-plane refractive index of A-layer; $d_A$ is the thickness of A-layer; $n_B$ is the in-plane refractive index of B-layer, $d_B$ is the thickness of B-layer, and m is a natural number showing the order. A layer thickness distribution that meets both equations (1) and (2) serves to eliminate reflections of even-numbered orders. Accordingly, the average reflectance in the wavelength range of 400 to 800 nm, which is included in the visible light range, can be decreased while maintaining a high average reflectance in the wavelength range of 900 nm to 1,200 nm, making it possible to produce a film having both a required transparency and a high heat ray shielding performance. In general, a film of thermoplastic resin that is molded and stretched has a refractive index of about 1.4 to 1.9, and accordingly, a film in which reflections of even-numbered orders are reduced can be obtained by adjusting the thickness ratio between mutually adjacent A-layer and B-layer (thickness of A-layer/thickness of B-layer) to 0.7 or more and 1.4 or less. Therefore, it is preferable for mutually adjacent A-layer and B-layer to have a thickness ratio (thickness of A-layer/thickness of B-layer) of 0.7 or more and 1.4 or less. It is more preferably 0.8 or more and 1.2 or less.

Figure 2:
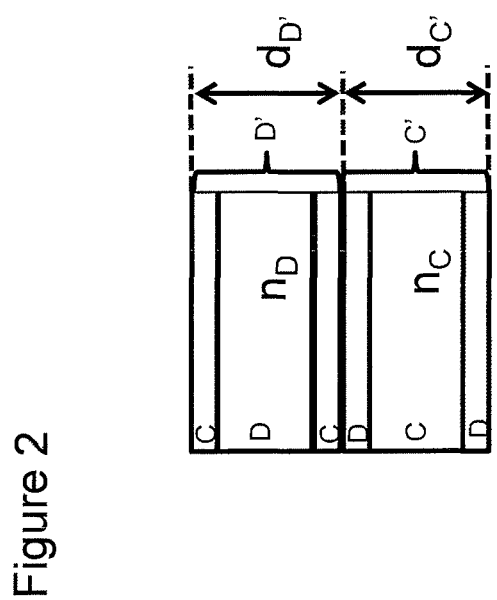
FIG. 2 shows a conceptual scheme of lamination unit 2.

In the case of aforementioned lamination unit 2, compared to the thinnest layer (having a thickness ratio of 1) of any set of three layers located adjacent to each other in lamination unit 2, it is preferable that one of the other two layer has a thickness ratio of 1.0 or more and 1.4 or less while the remaining layer has a thickness ratio of 5 or more and 9 or less. The above constitution is based on the 711 constitution set forth in the specification of U.S. Pat. No. 5,360,659. This constitution provides a method in which a layer is sandwiched between other layers that differ optically and have thicknesses of about ⅐ of the former to form a stack that can be deemed to be a single layer serving to reduce not only the second order reflection but also the third order reflection (see FIG. 2). Compared to the thinnest layer (having a thickness ratio of 1) of any set of three layers located adjacent to each other, it is preferable that the thickest layer has a thickness ratio of 5 to 9, more preferably 6 to 8, and the remaining layer has a thickness ratio of 1.0 to 1.4, more preferably 1.0 to 1.2. A value in this range serves to produce a film in which second and third order reflections are eliminated in the visible light range (wavelength range of 400 to 800 nm), assuming a reflection band covering 1,200 nm or more. In the case of these layer thicknesses, the first to third layers from the top are deemed to form C'-layer and the forth to sixth layers are deemed to form D'-layer as illustrated in FIG. 2, and equations (3) and (4), which are improved forms of equations (1) and (2), can be applied to reflection wavelength calculations.

[Formula 4]

$$\lambda/m = 2(n_C d_{C'} + n_D d_{D'}) \quad (3)$$

[Formula 5]

$$n_C d_{C'} = n_D d_{D'} \quad (4)$$

In the study for developing the film according to the present invention, it was found when a film containing only lamination unit 1 was used to reflect light of 900 nm to 1,800 nm in the wavelength range, third order (m=3) reflection occurred at about 300 nm to 600 nm to cause interference reflection at 400 nm to 600 nm in the visible light range, leading to a decrease in the light transmittance in the visible light range. On the other hand, when the present inventors studied the use of a film containing only lamination unit 2 to achieve an average reflectance as high as that achieved with lamination unit 1 alone in the intended reflection band (for example, wavelength range of 900 to 1,800 nm), the average reflectance was inferior in some cases where the film thicknesses were about the same as the film containing only lamination unit 1. It is inferred that lamination unit 2 forms a thin film that works as a pseudo interface that prevents the improvement in average reflectance. Accordingly, it was found when trying a film formed of only lamination unit 2, a larger number of layers was necessary and not only the equipment cost but also the film thickness increased, leading to an increase in film's axial rigidity and deterioration in handleability. As a result of intensive studies, the present inventors found that thin films serving for reflections with a high reflectance in reflection bands covering a wavelength range of 900 to 1400 nm or a wavelength range covering 900 to 1,800 nm can be produced by combining lamination unit 1 and lamination unit 2 at an appropriate ratio under appropriate conditions. It was also found that a simple combination of lamination unit 1 and lamination unit 2 leads to the problem of frequent formation of flow marks and uneven optical characteristics in the width direction because the pressure applied by resin to the undermentioned slit plates and slits differ between lamination unit 1 and lamination unit 2. As a result of intensive studies regarding this, the present inventors succeeded in identifying a suitable method on the basis of a properly adjusted ratio of lamination unit thicknesses at slit plates and insertion of a thick interlayer film between slit plates.

For the film according to the present invention, the layer constitution is preferably designed so that lamination unit 1 acts to reflect light in the wavelength range of 1,200 nm or less. As described above, a lamination unit 1 designed to reflect light in the wavelength range of 1,200 nm or more will also give a third order reflection in the visible light region. On the other hand, lamination unit 2 may be designed so as to reflect light in the wavelength range of 900 nm or more, but if lamination unit 1 works sufficiently to reflect light in the range of 900 to 1,200 nm, then the former is preferably designed so as to selectively reflect light in the range of 1,200 nm or more. The third order reflection will not occur even if it works in the range of 1,200 nm or less, but an increased number of layers will be required if it is to be designed so as to work for reflection over the large wavelength range from 900 to 1,800 nm. Accordingly, it is preferable for lamination unit 2 to be designed so as to reflect light only in the band of 1,200 nm or more to complement the reflection band of lamination unit 1. According to equation (1), it is preferable that lamination unit 1 has a layer thickness distribution such that the thickness per unit (total thickness of mutually adjacent A-layer and B-layer) is 250 nm or more and 400 nm or less and that the total thickness of the six layers in lamination unit 2 (total thickness of $d_{c'}$ and $d_{D'}$ in FIG. 2) is 300 nm or more and 600 nm or less, in order to meet the above reflection band requirement. Thickness values in these ranges ensure reflection of light in the wavelength range of 900 to 1,800 nm when the materials of the stacked layers have refractive indices of 1.5 to 1.8.

For the film according to the present invention, furthermore, lamination unit 1 preferably has a total thickness d1 of 5 μm or more. A lamination unit 1 having a total thickness d1 of 5 μm or more can act efficiently for reflection of light in the wavelength range of 900 to 1,200 nm. It is more preferably 10 μm or more, but if it is too thick, the final film thickness will increase and the reflectance in the intended reflection band will reach the upper limit of 100%. Thus, it is preferably 50 μm or less.

For the film according to the present invention, furthermore, lamination unit 2 preferably has a total thickness d2 of 20 μm or more. A lamination unit 2 having a total thickness, d2 of 20 μm or more allows the average reflectance in the wavelength range of 1,200 nm to 1,800 nm to be 50% or more and accordingly, it will be easy to achieve an average reflectance in the wavelength range of 900 nm to 1,800 nm of 70% or more. It is more preferably 20 μm or more and 50 μm or less.

The film according to the present invention, furthermore, preferably has a total thickness of 100 μm or less. If the film's total thickness is more than 100 μm, the handleability may deteriorate, leading, in particular, to an increased workload on glass fitting workers. In addition, the resulting roles will be very large in size and require large transport cost.

For either lamination unit 1 or lamination unit 2, or both lamination unit 1 and lamination unit 2 in the film according to the present invention, it is preferable for the total layer thickness of mutually adjacent six layers to have a continuous layer thickness distribution in the thickness direction of the film. As seen from equation (1) and equation (3), if all mutually adjacent layers have the same thickness, only single-wavelength reflections will occur. Furthermore, it is preferable for the distribution to have a continuous shape.

For example, although the layer thickness distribution may be such that lamination units 1 and lamination units 2 are stacked alternately, a continuous layer thickness distribution can ensure more intensive interference reflections, leading to an improved reflectance. To this end, it is preferable for the layer thickness distribution to be continuous with a certain inclination to the thickness direction. In the case of $A(BA)_n$, for example, a continuous distribution occurs when n is 10 or more, more preferably 20 or more.

For either lamination unit 1 or lamination unit 2, or both lamination unit 1 and lamination unit 2, it is preferable to include a region in which the total layer thickness of mutually adjacent six layers decreases gradually from either surface toward the central region of the film. As a result of intensive studies carried out by the present inventors, it was found that the reflectance in the visible light region decreases when the film has a layer thickness distribution in which the thickness decreases at least from either surface toward the central region of the film. Therefore, if the layer thickness has a gradient for a gradual decrease at least from either surface, the film according to the present invention will have good appearance when pasted on a glass surface etc. and observed from outside.

It is more preferable that the film includes a region in which the thickness decreases gradually from both surfaces toward the central region of the film. This allows the film to be more versatile as it shows better optical performance when used in sites where appearance from both surfaces is an important feature as in the case of laminated glass.

For either lamination unit 1 or lamination unit 2, or both lamination unit 1 and lamination unit 2 in the film according to the present invention, it is preferable to include both a region in which the total layer thickness of mutually adjacent six layers decreases gradually from a surface toward the central region of the film and another region in which it increases gradually from the other surface. Development of this structure ensures an increase in reflectance at the specific wavelength, and an intended reflection band and reflectance can be easily realized because if the thickness distribution is deformed in one region (for example, a region of gradual thickness decrease), the other region (for example, a region of gradual thickness increase) serves for complement. If larger numbers of regions of gradual increase and regions of gradual decrease are arranged alternately, it will be possible to prevent an increase in reflectance and the loss of reflection bands. As the numbers increase, however, the film will be thicker, and therefore, it is preferable that in lamination unit 1 and lamination unit 2, there are a total of two or less regions of gradual decrease and a total of two or less regions of gradual increase.

Figure 3:
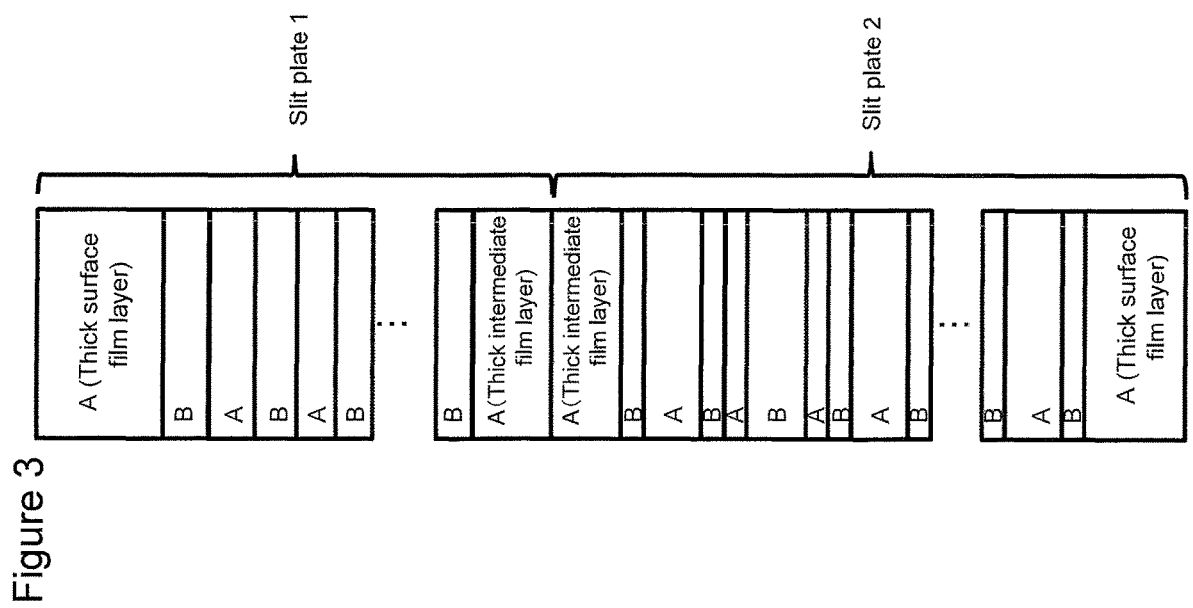
FIG. 3 shows a typical layer constitution that is formed when slit plate 1 and slit plate 2 are combined.

In addition, the film according to the present invention preferably contains a layer with a thickness of 1 μm or more. It is particularly preferable to include a surface layer with a thickness of 1 μm or more. The inclusion of a layer with a thickness of 1 μm or more serves to prevent the generation of an uneven lamination thickness distribution in the width direction, serving to ensure stable optical performance in the width direction. If the surface layer has a thickness of 1 μm or more, in particular, interference is depressed at the interface with the surface of glass to which the film is pasted, serving to prevent the occurrence of an iridescent unevenness. Accordingly, it is preferable for the film according to the present invention to have a surface layer with a thickness of 1 μm or more, more preferably 2 μm or more, and most preferably 3 μm or more. In addition, it is preferable that the film also contains a layer with a thickness of 1 μm or more at a position other than the surfaces (i.e., in the interior). In particular, such a layer is located preferably between lamination unit 1 and lamination unit 2 or near a layer formed by the end of a slit plate in the film production process described later (i.e., portions corresponding to a thick surface film layer or thick intermediate film layer). Lamination unit 1 and lamination unit 2 have different layer thickness structures and accordingly apply different resin pressures to slits. As a result, layer disturbance easily occurs particularly along the boundary between lamination unit 1 and lamination unit 2. In addition, uneven lamination easily occurs between slit plates in the film production process as a result of undergoing influence of heat generation from the resin under shear. Therefore, layers located inside the film or near a slit plate, particularly during the film production process, preferably has a thickness of 1 μm or more, more preferably 2 μm or more. For example, in a preferred thick intermediate film layer formation method, an A-layer discharged from slit plate 1 and another A-layer discharged from slit plate 2 in the film production process as described in FIG. 3 are combined into one layer (as illustrated in FIG. 3, A (thick intermediate film layer) discharged from slit plate 1 and A (thick intermediate film layer) discharged from slit plate 2 are stacked to form one thick intermediate film layer).

To realize reflections in the wavelength range of 900 to 1400 nm, the film according to the present invention preferably meets equation (5) given below where d1 is the total thickness of lamination unit 1 and d2 is the total thickness of lamination unit 2.

[Formula 6]

$$0.4 \leq d1/(d1+d2) < 1 \qquad (5)$$

The above equation indicates that the total thickness (d1 (μm)) of lamination unit 1 accounts for 40% or more and less than 100% of the total thickness (d1+d2 (μm)) of lamination unit 1 and lamination unit 2. Lamination unit 1 can achieve a relatively high reflectance even if the number of layers used is small and therefore, it is preferable to use it to form a reflection band over a range as wide as possible. In the case where all layers are of lamination unit 1, however, high order reflections will occur in the wavelength range of 400 to 450 nm when trying to realize a high average reflectance in the wavelength range of 900 to 1400 nm, as described above. Therefore, it is preferable that a smallest possible number of layers are used for reflections in the wavelength range of 900 to 1,200 nm. In the case of lamination unit 2, on the other hand, high order reflections will not occur easily whereas the reflectance will decrease easily if all units used are of lamination unit 2. Therefore, in the case where resin layers with nearly the same difference in refractive index are stacked in lamination unit 1 and lamination unit 2, the total thickness (d1 (μm)) of lamination unit 1 preferably accounts for 40% or more, more preferably 50% or more, and less than 100%, more preferably less than 60%, as upper limit, of the total thickness (d1+d2 (μm)) of lamination unit 1 and lamination unit 2, in order to maintain the highest possible reflectance while preventing high order reflections from occurring in the visible light range. Values in this range allow light in the wavelength range of 900 to 1400 nm to be reflected most efficiently and ensure the production of a film with a small thickness.

To realize reflections in the wavelength range of 900 to 1,800 nm, furthermore, the film according to the present invention preferably meets equation (6) given below where d1 is the total thickness of lamination unit 1 and d2 is the total thickness of lamination unit 2.

[Formula 7]

$$0.01 \leq d1/(d1+d2) < 0.4 \quad (6)$$

The above equation indicates that the total thickness (d1 (μm)) of lamination unit 1 accounts for 1% or more and less than 40% of the total thickness (d1+d2 (μm)) of lamination unit 1 and lamination unit 2. Lamination unit 1 can achieve a relatively high reflectance even if the number of layers used is small and therefore, it is preferable to use it to form a reflection band over a range as wide as possible. In the case where all layers are of lamination unit 1, however, high order reflections will occur in the wavelength range of 400 to 600 nm when trying to realize a high average reflectance in the wavelength range of 900 to 1,800 nm, as described above. Therefore, it is preferable that a smallest possible number of layers are used for reflections in the wavelength range of 900 to 1,200 nm. In the case of lamination unit 2, on the other hand, high order reflections will not occur easily whereas the reflectance will decrease easily if all units used are of lamination unit 2. Therefore, in the case where resin layers with nearly the same difference in refractive index are stacked in lamination unit 1 and lamination unit 2, the total thickness (d1 (μm)) of lamination unit 1 preferably accounts for 1% or more, more preferably 10% or more, and less than 40% as upper limit, of the total thickness (d1+d2 (μm)) of lamination unit 1 and lamination unit 2, in order to maintain the highest possible reflectance while preventing high order reflections from occurring in the visible light range. Values in this range allow light in the wavelength range of 900 to 1,800 nm to be reflected most efficiently and ensure the production of a film with a small thickness.

Useful thermoplastic resins to form multi-layered laminated films that can serve for the present invention include, for example, polyolefins such as polyethylene, polypropylene, and poly(4-methylpentene-1);

cycloolefins such as alicyclic polyolefins prepared through ring opening metathesis polymerization or addition polymerization of norbornenes and copolymers prepared through addition polymerization thereof with other olefins;

biodegradable polymers such as polylactic acid and polybutyl succinate; polyamides such as nylon 6, nylon 11, nylon 12, and nylon 66;

aramid, polymethyl methacrylate, polyvinyl chloride, polyvinylidene chloride, polyvinyl alcohol, polyvinyl butyral, ethylene vinyl acetate copolymer, polyacetal, polyglycolic acid, polystyrene, styrene-copolymerized polymethyl methacrylate, and polycarbonate, polyesters such as polypropylene terephthalate, polyethylene terephthalate, polybutylene terephthalate, and polyethylene-2,6-naphthalate;

polyether sulfone, polyether ether ketone, modified polyphenylene ether, polyphenylene sulfide, polyether imide, polyimide, and polyallylate; and tetrafluoroethylene resin, trifluoroethylene resin, trifluoroethylene chloride resin, tetrafluoroethylene-hexafluoropropylene copolymer, and polyvinylidene fluoride. Among others, the use of a polyester is particularly preferable from the viewpoint of intensity, heat resistance, and transparency, and preferable polyesters include those produced from aromatic dicarboxylic acid or aliphatic dicarboxylic acid and diols or derivatives thereof. Here, useful aromatic dicarboxylic acids include, for instance, terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, and 4,4'-diphenylsulfone dicarboxylic acid. Useful aliphatic dicarboxylic acids include, for example, adipic acid, suberic acid, sebacic acid, dimer acid, dodecanedioic acid, cyclohexane dicarboxylic acid, and ester derivatives thereof. Of these, particularly preferable ones include terephthalic acid, and 2,6-naphthalene dicarboxylic acid. These acid components may be used singly or two or more thereof may be used in combination, and they may be partly copolymerized with an oxyacid such as hydroxybenzoic acid.

On the other hand, useful diol components include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl) propane, isosorbate, and spiroglycol. Among others, the use of ethylene glycol is preferred. These diol components may be used singly or two or more thereof may be used in combination.

Of the above polyesters, preferable ones include those selected from the following: polyethylene terephthalate and copolymers thereof, polyethylene naphthalate and copolymers thereof, polybutylene terephthalate and copolymers thereof, polybutylene naphthalate and copolymers thereof, polyhexamethylene terephthalate and copolymers thereof, polyhexamethylene naphthalate and copolymers thereof.

Of the above ones, the use of a polyethylene naphthalate based resin as a high refractive index type resin is particularly preferable. This serves to easily realize a large difference in refractive index from the low refractive index type resin used, making it possible to achieve both an increased reflection band and a decreased film thickness.

In addition, the above thermoplastic resins may also contain various additives including, for instance, antioxidant, thermal stabilizer, weathering stabilizer, ultraviolet absorber, organic lubricant, pigment, dye, organic or inorganic fine particles, filler, antistatic agent, nucleating agent, and fluidizing agent unless they deteriorate the characteristics thereof.

For the film according to the present invention, the aforementioned thermoplastic resin A and thermoplastic resin C in the non-oriented state preferably have a refractive index of 1.55 to 1.7, and the aforementioned thermoplastic resin B and thermoplastic resin D in the non-oriented state preferably have a refractive index of 1.5 to 1.65. The refractive index of a resin in the non-oriented state is determined by scraping out a specimen from each resin in the laminated film and melting it, followed by measuring the refractive index. If thermoplastic resin A and thermoplastic resin C in the non-oriented state have a refractive index of 1.55 to 1.7, they are likely to have refractive indices even after stretching. On the other hand, if thermoplastic resin B and thermoplastic resin D in the non-oriented state have refractive indices of 1.5 to 1.65, preferably 1.55 to 1.6, it will be easy to realize a significant difference between thermoplastic resin A and thermoplastic resin C in a stretched state. For the above determination, a specimen is scraped out from a stretched film and melted once at a high temperature and its refractive index can be measured by any of various available measuring methods.

To ensure that mutually adjacent layers (that is, A-layer and B-layer, or C-layer and D-layer) to have a difference in refractive index after the resin orientation step, it is preferable that the resins used to form A-layer and C-layer are crystalline and at the same time the resins used to form B-layer and D-layer each is one that undergoes relaxation of orientation and a consequent decrease in refractive index when heat-treated at or above the melting point, or that is amorphous, or that is a mixture of an amorphous thermoplastic resin and a crystalline thermoplastic resin. In this case, the difference in refractive index can be increased further by stretching and heat treatment steps in the film production process, making it easy to allow the film to have a reflection band where the reflectance is 30% or more.

For the film according to the present invention, it is also preferable that there exists a hard coat layer in close proximity to at least either surface of the film to form a layered body having visible light transmittance of 70% or more and total solar energy transmittance of 50% or less as specified in ISO9050. For the present invention, a hard coat layer is one that has a pencil hardness of HB or higher according to JIS K5600-5-4. The inclusion of such a layer makes the film to show a high cut resistance and reliability when used in a heat shield member. It is preferable that the hard coat layer contains a heat ray absorbent. Examples of such a heat ray absorbent include tungsten compounds, lanthanum compounds, antimony compounds, indium compounds, and tin compounds, and in particular, tungsten oxide compounds are preferred. Tungsten oxide compounds show high heat ray absorption performance not only in the long wavelength band of 1,500 nm or more but also in the wavelength band of 700 to 1,500 nm. Compared to this, some lanthanum compounds, antimony compounds, indium compounds, and tin compounds fail to show sufficiently high heat ray absorption performance in the wavelength band of 700 to 1500 nm in spite of showing high heat ray absorption performance in the long wavelength band of 1500 nm or more. In particular, the film according to the present invention has a reflection band covering the wavelength range of 900 to 1,800 nm, and lamination unit 2 works in the wavelength range of 1,200 nm or more, and accordingly, a required reflectance may not be achieved in the above case. This suggests that if a lanthanum compound, antimony compound, or indium compound is used in the film according to the present invention, light in the wavelength bands of 700 to 850 nm and 1,200 to 1500 nm will not be shut off sufficiently. On the other hand, compared to lanthanum compounds, antimony compounds, and indium compounds, and tin compounds, tungsten oxide compounds can show high heat shield performance at 700 to 1500 nm. Therefore, when a tungsten oxide compound is used in the film according to the present invention, in particular, light in the wavelength band of 700 nm or more can be shut off nearly completely to ensure high heat shield performance. For this reason, the total content of lanthanum compounds, antimony compounds, indium compounds, and tin compounds is preferably 1 mass % or less in the hard coat layer in the layered body for the present invention. It is more preferably 0.1 mass % or less, and more preferably 0.01 mass % or less. The tungsten oxide compound referred to herein may be a pure tungsten oxide or a tungsten oxide based compound containing a metal other than tungsten. There are no specific limitations on the metal other than tungsten referred to above, and preferred examples include, for example, cesium tungsten oxide, thallium tungsten oxide, indium tungsten oxide, and magnesium tungsten oxide. For the present invention, in particular, the use of a cesium tungsten oxide is preferable from the viewpoint of its high infrared ray shut-off rate (high heat ray absorption efficiency), small absorption of visible light, and highly stable optical characteristics. There are no specific limitations on the content of tungsten oxide compounds in the hard coat layer as long as the average transmittances in the wavelength ranges of 400 to 800 nm and 900 to 1,200 nm, which will be described later, are in preferable ranges, but typically, it is preferably 1 mass % or more and 80 mass % or less of the entire hard coat layer. If the content is less than 1 mass %, it will be necessary to increase the thickness of the hard coat layer excessively in order to realize a small transmittance in the wavelength range of 900 to 1,200 nm, which may not be preferred in some cases from the viewpoint of handleability and cost. If the content is more than 80 mass %, on the other hand, it will be difficult to control the transmittance of light by varying the film thickness, possibly leading to removal of the tungsten oxide compound (heat ray absorbent) or the like. It is preferably 10 mass % or more and 75% or less, more preferably 20 mass % or more and 70% or less.

There are no specific limitations on the type of resin to use to form the hard coat layer, and useful examples include acrylic resin, urethane resin, polyester resin, and silanol, which may be used singly or in combination. Preferred examples of the acrylic resin include, for example, methacrylic acid, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, hydroxypropyl methacrylate, acrylic acid, methyl acrylate, ethyl acrylate, isopropyl acrylate, n-butyl acrylate, isobutyl acrylate, n-hexyl acrylate, lauryl acrylate, acrylic acid 2-ethylhexyl glycidyl acrylate, glycidyl methacrylate, 4-hydroxybutyl acrylate glycidyl ether, 4-hydroxybutyl methacrylate glycidyl ether, phenyl glycidyl acrylate, epoxy acrylate, epoxy methacrylate, and dipentaerythritol hexaacrylate.

In addition, the inclusion of an initiator, curing agent, and catalyst is preferable because they can promote the curing. It is preferable that the initiator used is one that can initiate or promote polymerization, condensation, or crosslinking through anionic, cationic, radical reactions, etc. Various useful initiators, curing agents, and catalysts are available. These initiators, curing agents, and catalysts may be used singly, or two or more of the initiators, curing agents, and catalysts may be used together. In addition, acidic catalysts, thermal polymerization initiators, and photopolymerization initiators may also be used in combination, and among others, the use of a photopolymerization initiator is preferable. Examples of the acidic catalysts include aqueous hydrochloric acid solution, formic acid, and acetic acid. Examples of the thermal polymerization initiators include peroxides and azo compounds. Furthermore, examples of the photopolymerization initiators include alkyl phenon based compounds, sulfur-containing compounds, acylphosphine oxide based compounds, and amine based compounds. As the photopolymerization initiator, the use of an alkyl phenon based compound is preferable because of its high curing performance. Specific examples of the alkyl phenon based compounds include 1-hydroxy-cyclohexyl-phenyl-ketone, 2,2-dimethoxy-1,2-diphenyl ethane-1-one, 2-methyl-1-(4-methylthiophenyl)-2-morpholinopropane-1-one, 2-benzyl-2-dimethylamino-1-(4-phenyl)-1-butane, 2-(dimethylamino)-2-[(4-methylphenyl) methyl]-1-(4-phenyl)-1-butane, 2-benzyl-2-dimethylamino-1-(4-morpholinophenyl)-1-butane, 2-(dimethylamino)-2-[(4-methylphenyl) methyl]-1-[4-(4-morpholinyl)phenyl]-1-butane, 1-cyclohexyl-phenyl ketone, 2-methyl-1-phenylpropane-1-one, and 1-[4-(2-ethoxy)-phenyl]-2-hydroxy-2-methyl-1-propane-1-one.

For the present invention, there are no specific limitations on the thickness of the hard coat layer, but it is preferably 0.1 μm or more and 50 μm or less. It is more preferably 30 μm or less, still more preferably 10 μm or less. If the thickness of the hard coat layer is less than 0.1 μm, it tends to become difficult to control the thickness of the hard coat layer with high accuracy, occasionally leading to uneven heat shield performance. If the thickness of the hard coat layer is more than 50 μm, on the other hand, the thickness of the hard coat layer may become too thick relative to the base film, and the hard coat layer may have influence on the mechanical properties of the film according to the present invention, which may not be preferred. If the thickness of the hard coat layer is 0.1 μm or more and 50 μm or less, the layer thicknesses can be controlled with high accuracy in spite of the existent of the hard coat layer, making it possible to reduce the unevenness of heat shield performance. In addition, the thickness of the hard coat layer is sufficiently small relative to the thickness of the base film, making it also possible to reduce changes from occurring in physical properties of the layered body according to the present invention.

For the layered body according to the present invention, it is preferable that a hard coat layer is provided only on one side of the base film. Tungsten oxide used in the layered body according to the present invention shows high absorbability in the wavelength band 850 to 1,200 nm, but as light enters the base film through the hard coat layer, it is shut off almost completely by the hard coat layer, and accordingly significant heat shield effect by reflection cannot be expected. Here, if light is shut off by reflection, it will not reach the other side of the heat shield member opposite to the surface of incidence, but light is shut off by absorption, part of it is converted into heat and enters the member. Compared to the case of reflection, therefore, the heat shield member will be inferior in performance. Thus, for the heat shield member to work effectively, it is constructed in such a manner that a base film is provided on the light incoming side to increase the efficiency in heat shield by reflection whereas a hard coat layer is provided on the light outgoing side to shut off light that cannot be removed by the base film. Such a construction allows the heat shield member to reduce the inflow of light and heat more efficiently while maintaining a high heat shield performance.

For the layered body according to the present invention, furthermore, it is preferable that a hard coat layer is provided in close proximity to one side of the base film whereas a sticking layer is attached on the other side. Preferred examples of such a sticking layer include those containing an acrylic sticking agent, silicone based sticking agent, rubber based sticking agent, etc. As the film according to the present invention is intended for pasting on glass windowpanes where it is exposed to sunlight, the sticking layer preferably contains a UV absorber that has an absorption band in the wavelength range of 200 to 400 nm to prevent the film from being degraded by UV light. The sticking layer referred to herein is one that requires a peeling force of 0.1 N/mm or more when the body is put on a glass plate with that layer down at room temperature and normal humidity, followed by removing the layer.

Described next is a preferred production method for the film according to the present invention for the case where two polyester resins are adopted in such a manner that thermoplastic resin A and thermoplastic resin C of the same resin whereas thermoplastic resin B and thermoplastic resin D are of the same resin. Needless to say, it should be understood that the invention is not construed as being limited thereto. It should also be noted that the production of such a lamination structure suitable for the film according to the present invention can be achieved on the basis of the description given in paragraphs [0053] to [0063] of Japanese Unexamined Patent Publication (Kokai) No. 2007-307893.

The polyester resins are prepared in the form of pellets. The pellets are dried in hot air or in a vacuum, as required, and supplied to separate extruders. In each extruder, the resin is heat-melted at or above the melting point and sent through a filter etc. to remove foreign objects, modified resin components, etc., while controlling the resin extrusion at a constant rate by a gear pump. These resins are molded by a die into intended shapes and then discharged. Then, the multilayer laminated sheet is discharged from the die, extruded onto a cooling body such as a casting drum to cool it for solidification to provide a cast film. In this process, it is preferable that wire type, tape type, needle type, or knife type electrodes are used to maintain close contact to a cooling body such as a casting drum by an electrostatic force to quench it for solidification. It is also preferable to supply air from a slit type, spot type, or plane type apparatus to maintain close contact to a cooling body such as a casting drum to quench it for solidification, or use nip rolls to maintain close contact to a cooling body to quench it for solidification.

To form a laminated film constructed of a plurality of polyester resins, the plurality of resins are fed to two or more extruders and discharged through different flow channels to a lamination apparatus. Useful lamination apparatuses include multimanifold die, feedblock, and static mixer, but among others, it is preferable to use a feedblock that has at least two or more separate members each having many fine slits to ensure efficient production of films of the constitution according to the present invention. In particular, the use of this type of feedblock eliminates the necessity for an extremely large apparatus, serving to prevent foreign objects from being formed as a result of heat degradation and perform high accuracy lamination even when the stack contains an extremely large number of layers. In addition, the lamination accuracy in the width direction is also improved dramatically compared with the conventional techniques. It will also be possible to form a structure with any desired layer thicknesses. With the above apparatus, the thickness of each layer can be controlled by adopting appropriate slit shapes (length and width), which makes it possible to allow layers to have any desired thicknesses.

In this way, a molten multilayer laminated body having an intended layer structure can be formed and it is introduced to a die to provide a cast film as described above.

A cast film prepared in this way is preferably stretched biaxially. Here, stretching biaxially means stretching in both the length direction and the width direction. The stretching may be performed sequentially in the two directions or simultaneously in the two directions. Furthermore, the film may be re-stretched in the length direction and/or in the width direction.

First, described below is a case where the film is subjected to sequential biaxial stretching. Here, stretching in the length direction is performed with the aim of developing molecular orientation in the length direction of the film, and commonly, it is achieved by using rollers having different circumferential speeds. This stretching may be performed in a single stage or in multiple stages using two or more pairs of rollers. The required stretching ratio depends on the type of resin, but commonly, it is preferably 2 to 15, particularly preferably 2 to 7. Furthermore, the stretching temperature is preferably between the glass transition temperature of the resin that is highest in glass transition point of all resins used in the laminated film according to the present invention and the temperature that is 100° C. above that glass transition temperature.

The uniaxially stretched film prepared in this way may be subjected to surface treatment such as corona treatment, flame treatment, and plasma treatment, followed by in-line coating to impart functions to develop lubricity, adhesiveness, antistatic property, etc., as required.

Compared to this, stretching in the width direction is intended to develop orientation in the width direction of the film. Commonly, a tenter is used to hold both ends of the film by clips and it is conveyed while stretching the film in the width direction. The required stretching ratio depends on the type of resin, but commonly, it is preferably 2 to 15, particularly preferably 2 to 7. Furthermore, the stretching temperature is preferably between the glass transition temperature of the resin that is highest in glass transition point of all resins used in the laminated film according to the present invention and the temperature that is 120° C. above that glass transition temperature.

It is preferable for the film stretched biaxially in this way to be subjected to heat treatment in the tenter at a temperature above the stretching temperature and below the melting point Tm in order to improve the planarity and dimensional stability. Such heat treatment serves to improve the dimensional stability of the film. After the heat treatment, the film is cooled slowly and uniformly to room temperature and wound up. As required, relaxation treatment etc. may also be performed between the heat treatment and slow cooling.

Next, described below is a case where the film is subjected to simultaneous biaxial stretching. In the case of simultaneous biaxial stretching, the film obtained above may be subjected to surface treatment such as corona treatment, flame treatment, and plasma treatment, followed by in-line coating to impart functions to develop lubricity, adhesiveness, antistatic property, etc., as required.

Then, the cast film is introduced into a simultaneous biaxial tenter and conveyed as both ends of the film are held by clips, followed by stretching it in the length direction and the width direction simultaneously and/or in stages. Useful simultaneous biaxial stretching machines include pantagraph type, screw type, drive motor type, and linear motor type ones, of which the use of a drive motor type machine or a linear motor type machine is preferable because the stretching ratio can be controlled as desired and relaxation treatment can be performed at any desired place. The required stretching ratio depends on the type of resin, but commonly, it is preferably 6 to 50, particularly preferably 8 to 30, as area ratio. In the case of simultaneous biaxial stretching, in particular, it is preferable to stretch the film in the length direction and the width direction at the same stretching ratio and at nearly the same stretching speed in order to minimize the in-plane orientation unevenness. Furthermore, the stretching temperature is preferably between the glass transition temperature of the resin used in the laminated film according to the present invention and the temperature that is 120° C. above that glass transition temperature.

It is preferable for the film stretched biaxially in this way to be immediately subjected to heat treatment in the tenter at a temperature above the stretching temperature and below the melting point in order to improve the planarity and dimensional stability. If such heat treatment is to be performed, it is preferable to carry out relaxation treatment quickly immediate before and/or immediately after the heat treatment zone in order to depress the distribution of the main orientation axis in the width direction. After the heat treatment, the film is cooled slowly and uniformly to room temperature and wound up.

In the case where thermoplastic resin A and thermoplastic resin C are different from each other or where thermoplastic resin B and thermoplastic resin D are different from each other, the requirement can be met by, for example, preparing a laminated film by the above procedure from thermoplastic resin A and thermoplastic resin B and preparing another laminated film by the above procedure from thermoplastic resin C and thermoplastic resin D and combining them. Another good method is to use two lamination apparatuses to form two separate laminated molten layers from different resins and combine the two laminated molten layers in a multimanifold die or the like. For example, lamination apparatus 1 may have a slit plate only for lamination unit 1 whereas lamination apparatus 2 may have a slit plate only for lamination unit 2. In this case, they are designed preferably in such manner that thermoplastic resin A comes in contact with thermoplastic resin C.

It is also preferable to provide a hard coat layer at least on either side of the base film prepared above.

For example, a good technique to form a hard coat layer on one side or both sides of the base film is to coat one side or both sides of the base film with a coating liquid that contains a composition designed for forming the hard coat layer and a solvent if necessary. Here, useful coating methods include generally known coating methods such as gravure coating, micro-gravure coating, die coating, reverse coating, knife coating, and bar coating.

A composition designed for forming the hard coat layer is spread on the base film, followed by heating to evaporate the solvent. From the viewpoint of heating efficiency, such heating is preferably performed by using hot air and useful apparatuses include generally known hot air driers and air heating furnaces having a mechanism designed to perform continuous conveyance by roll conveyance and floating. The drying temperature used in this step is preferably 120° C. or less, more preferably 100° C. or less, and still more preferably 80° C. or less.

In some cases, photo-curing or electron curing may be performed after the heating step. If a photo-curable resin or an electron curable resin is used in combination, it will be possible to fix the hard coat layer in a shorter time, serving to improve the performance in terms of productivity and film stability. If photo-curing or electron curing is to be performed, it is preferably to adopt electron beam (EB) or ultraviolet ray (UV) from the viewpoint of versatility. Useful types of ultraviolet ray lamps that can be used for applying ultraviolet ray include, for example, electric discharge lamp, flash lamp, laser, and electrodeless lamp. Among others, it is preferable to use a high pressure mercury vapor lamp, which is a kind of electrical discharge lamp, in order to perform ultraviolet ray curing.

For the layered body according to the present invention, it is preferable that a hard coat layer is provided in close proximity to at least one side of the base film. Being provided in close proximity to at least one side of the base film means that the distance between the at least one side of the base film and the interface of the hard coat layer is 1 µm or less. More specifically, embodiments where a hard coat layer is provided in close proximity to at least one side of the base film include one in which a hard coat layer is disposed in direct contact with at least one side of the base film and one in which another layer with a thickness of 1 µm or less is disposed between the hard coat layer and at least one side of the base film. As another preferred embodiment of the present invention, an adhesive layer may be provided between the base film and the hard coat layer to ensure improved adhesiveness.

The film and layered body according to the present invention are particularly effective in reflecting heat ray at 900 to 1,800 nm and able to be pasted easily on glass with an sticking agent etc., and accordingly, they can be used suitably in heat ray reflection films for buildings, automobiles, etc., and protective films in large type display devices for outdoor use.

[Methods for Measurement of Properties]

(1) Layer Thickness, Number of Stacked Layers, Lamination Structure

The layer constitution of the film was determined by observing a cross-sectional sample prepared with a microtome by transmission electron microscopy (TEM). More specifically, transmission electron microscope H-7100FA (manufactured by Hitachi, Ltd.) was used to observe a cross section of the film at a magnification of 10,000 to 40,000 under the condition of an accelerating voltage of 75 kV, and a cross-sectional photograph was taken and examined to determine the layer constitution and the thickness of each layer. In some cases, a generally known dyeing technique that uses $RuO_4$, $OsO_4$, etc. was performed to achieve an increased contrast. The layer with the smallest thickness (thinnest layer) of all layers included in an image was identified first, and observation was performed at a magnification of 100,000 when the thinnest layer has a thickness of less than 50 nm, 40,000 when the thinnest layer has a thickness of 50 nm or more and less than 500 nm, or 10,000 when the thinnest layer has a thickness of 500 nm or more.

(2) Method for Calculation of Layer Thickness

The TEM photograph image file obtained in paragraph (1) was opened by image processing software Image-Pro Plus ver. 4 (distributed by Planetron, Inc.) to perform image analysis. Image analysis was performed in the vertical thickness profile mode, and the relation between a thickness-directional position and the average brightness between two width-directional lines was read to obtain numerical data. Using a spreadsheet program (Excel 2000), sampling from the position (nm) and brightness data was performed by a sampling step of 2 (two-step thinning) and then numerical processing was carried out to obtain five-value moving average data. Subsequently, the resulting data on periodically changing brightness were differentiated to determine maximum values and minimum values in the differential curve by a VBA (Visual Basic for Applications) program, and layer thickness calculation was performed on the basis of the distances between each region containing a maximum brightness and an adjacent region containing a minimum brightness which were assumed to represent the thicknesses of the layers. Each of the photographs was examined by this procedure to calculate the thicknesses of all layers.

(3) Reflectance, Transmittance, Rate of Solar Radiation Heat Acquisition, and Visible Light Reflectance A 5 cm×5 cm sample was cut out and examined to determine its reflectance using the basic configuration of a spectrophotometer manufactured by Hitachi, Ltd. (U-4100 Spectrophotamater) using the accessory integrating sphere. For the reflectance measurement, a reference value was taken from an auxiliary white plate of aluminum oxide attached to the equipment and measurements were taken from the sample which was fixed with its length pointing in the vertical direction. The reflectance and transmittance at an azimuth angle of 0 were measured under the following measuring conditions: a slit size of 2 nm (visible)/automatically controlled (infrared), a gain setting of 2, and a scanning speed of 600 nm/min. Based on the resulting spectrum, the reflectance in the range of 1,200 to 1,800 nm was determined at intervals of 1 nm and the values obtained were averaged. Furthermore, of the reflection bands in which the reflectance continuously exceeds 30%, 50%, or 70%, the widest ones are shown in Tables 4 and 8.

From results of reflectance measurement and transmittance measurement, the rate of solar radiation heat acquisition and the visible light reflectance were calculated by the calculation method specified in ISO9050. It should be noted, however, that the calculation method specified in ISO9050 uses weighted coefficients applied to solar light energy, and therefore, the reflectance in the visible light range is not strictly equal to the visible light reflectance.

(4) Refractive index (refractive index in in-plane oriented state) Measurements were taken according to Method A specified in JIS K7142 (1996). The refractive index of the film according to the present invention in the non-oriented state was determined by scraping out a sample from each layer, heating it once to above the melting point, and subjecting it to refractive index measurement by the aforementioned procedure.

(5) Measurement of Tm of Film

A sample to be examined was cut out of the film and subjected to differential scanning calorimetry (DSC) according to JIS-K-7122 (1987) using differential scanning calorimetry system Robot DSC-RDC220 manufactured by Seico Electronics industrial Co., Ltd. and Disk Session SSC/5200 for data analysis by the following procedure: heating (first heating) from 25° C. to 300° C. at a rate of 20° C./min, maintaining the state for 5 minutes, and quenching to 25° C. or less. Subsequently, the sample was heated again from room temperature to 300° C. (second heating) at a heating rate of 20° C./min and subjected to measurement. The resulting differential scanning calorimetry chart (second heating curve) was used to determine the melting point Tm. When a plurality of values was obtained, the one at the highest temperature was adopted.

(6) Structural Analysis of Material Forming Multilayer Laminated Film

There are no specific limitations on the method to use for structural analysis of the material forming the multilayer laminated film, but a good procedure is described below. For example, a weight peak is identified by gas chromatograph mass analysis (GC-MS). Then, Fourier transform infrared (FT-IR) spectroscopy analysis is performed to check if there is a peak attributed to the interatomic bond expected in an assumed structure. In addition, proton nuclear magnetic resonance spectroscopy ($^1$H-NMR) analysis is carried out to determine the position of the chemical shift attributed to the positions of hydrogen atoms in the structural formula and the proton absorption line area attributed to the number of hydrogen atoms. It is desirable that a final decision is made based on comprehensive study of all these results.

(7) Flow Marks

For a specific position in the length direction, samples were collected from an A4-size area and rated according to the following criteria.

: No streaks are found.

◯: Streaks are found in one or two of randomly collected 10 samples.

Δ: Streaks are found in three or more of randomly collected 10 samples.

x: Streaks are found in all film samples.

(8) Spectral Unevenness in the Width Direction

For spectroscopic measurements of the rate of solar radiation heat acquisition and visible light reflectance taken at intervals of 100 mm over a distance of 1 m in the width direction as specified in ISO9050, calculation was performed as follows: relative error=(maximum value−minimum value)/average value×100.

⊚: The relative error is less than 2% for both the rate of solar radiation heat acquisition and the visible light reflectance.
○: The relative error in the rate of solar radiation heat acquisition or that for the visible light reflectance, whichever the larger, is 2% or more and less than 5%.
Δ: The relative error in the rate of solar radiation heat acquisition or that for the visible light reflectance, whichever the larger, is 5% or more and less than 10%.
x: The relative error in the rate of solar radiation heat acquisition or that for the visible light reflectance, whichever the larger, is 10% or more.

(8) Axial Rigidity

For the direction where the film's in-plane refractive index is high and the direction perpendicular thereto, three 1 cm (width)×10 cm strips each were taken and the Young's modulus of the film was measured by a Tensilon universal tester (RTG-1210) manufactured by Baldwin. The Young's modulus measurements were averaged, and the axial rigidity was calculated as: average Young's modulus×cross section area (thickness μm×1 cm)/length (10 cm).

(9) Pasting on Glass Surface

Either surface of an A4-size sample of the film was laminated with a sheet of a pressure sensitive sticking agent (PSA) manufactured by Tomoegawa Co., Ltd. and pasted on a curved glass plate (R=1,000 mm, 210 mm×247 mm×3 mm) while applying hot air from a heat gun. After leaving them in a stationary state for 24 hours, the film on the glass was observed and ranked as ○ if free of bubbles or peeling near the edges and ranked as x if otherwise.

(10) Pencil Hardness

Measurements were taken according to JIS K5600 (1999). The hard coat surface was examined. For a sample having no hard coats, both surfaces were examined and the higher hardness value was adopted.

EXAMPLES

The present invention will now be illustrated with reference to Examples, but it should be understood that the invention is not construed as being limited only thereto.

Comparative Example 1

A polyethylene naphthalate (PEN) polymer with an intrinsic viscosity of 0.60 and a Tm of 268° C. was used as thermoplastic resin A whereas a mixture of a copolymer of a polyethylene terephthalate (PET) resin with 30 mol % cyclohexanedimethanol and a PET resin (manufactured by Toray Industries, Inc.; IV 0.65, Tg 79° C., Tm 255° C.) mixed at a mass ratio of 82:18 was used as thermoplastic resin B (shown as PETG resin in Tables). Here, the refractive index in the non-oriented state of the PEN polymer was 1.65 and that of the PETG resin was 1.58.

Figure 4:
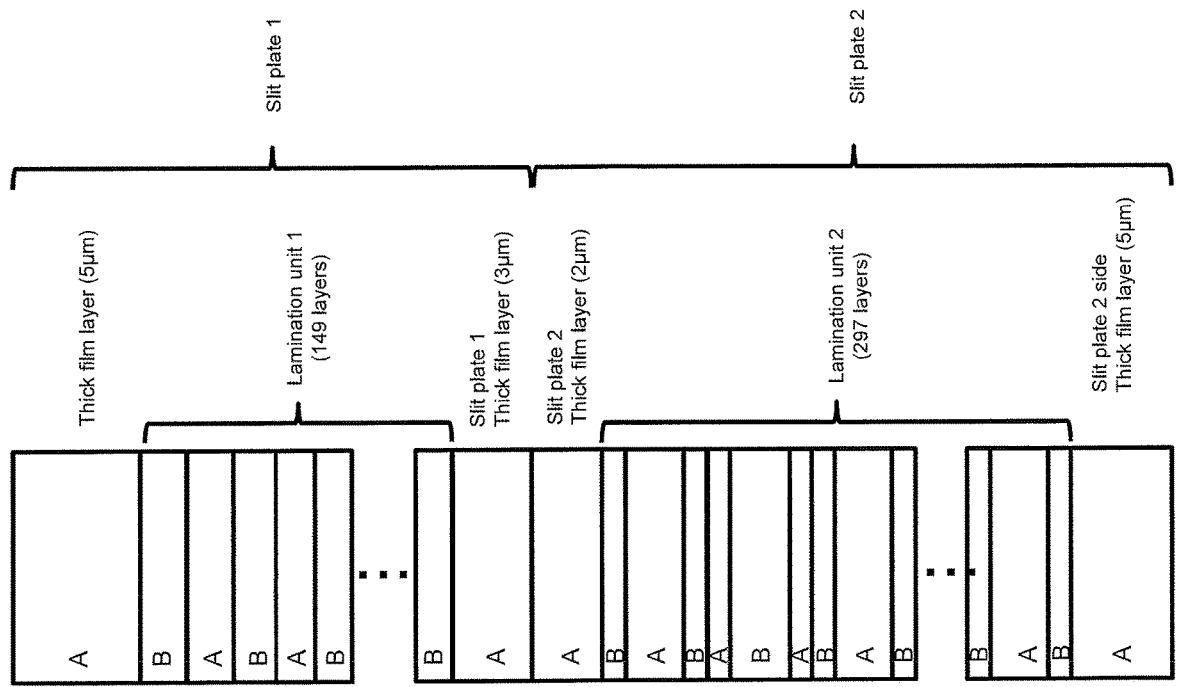
FIG. 4 shows the relation between slit plate 1 and slit plate 2 in lamination apparatus 1.
Figure 5:
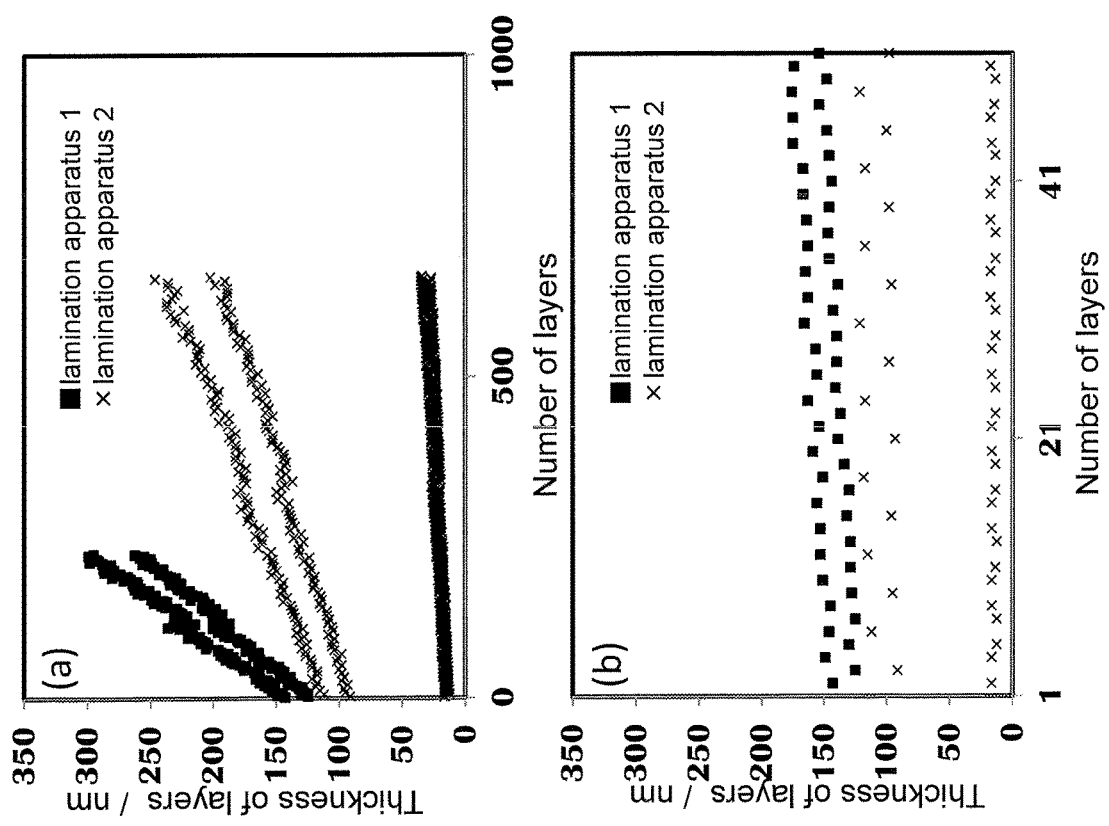
FIG. 5 (a) shows the distribution of the total thickness of the film in lamination apparatuses 1 and 2 and (b) shows an enlarged view for layers 1 to 51.

Thermoplastic resins A and B thus prepared were melted separately at 300° C. in a vented twin screw extruder and sent through a gear pump and a filter while measuring to adjust the optical thickness ratio between the A-layer and the B-layer (excluding the film's thick layer) to 0.9 as they were combined in lamination apparatus 1 to form a laminated film containing a total of 225 stacked layers having the following layer constitution: (thick surface layer of thermoplastic resin A)/(lamination unit 1 containing a total of 111 A-layers and B-layers stacked alternately in the thickness direction)/(thick intermediate layer of thermoplastic resin A)/(lamination unit 1 containing a total of 111 A-layers and B-layers stacked alternately in the thickness direction)/(thick surface layer of thermoplastic resin A). Here, there is a layer consisting of two stacked A-layers and thick layers at both surfaces, and accordingly, the two slit plates each have 113 gaps (see FIG. 4). To form layers to serve as thick intermediate layers, gaps for the thick intermediate layers were provided so as to ensure final thicknesses of 3.5 and 1.5 μm at the slit plates, and gaps were also provided so as to ensure the formation of thick layers of 7, 3 μm as surface layers. Here, lamination apparatus 1 was designed to form only lamination, unit 1 and configured to provide a laminated film having such a layer thickness distribution as illustrated in FIG. 5 so that it would have a reflection band in the wavelength range of 1,800 nm or less and also that the average reflectance in the wavelength range of 900 nm to 1,800 nm would be 70% or more. The layers were combined in lamination apparatus 1 and introduced to a T-die where they were molded into a sheet, which was then sent electrostatically onto a casting drum having a surface temperature maintained at 25° C. and quenched for solidification to produce a cast film.

The resulting cast film was heated on a group of rollers set at 135° C. and then stretched 4.2 times in the vertical direction while being heated rapidly in a stretching zone with a length of 100 mm where heat was applied by a radiation heater to both surfaces of the film. The film's temperature was 135° C. during the stretching step. Subsequently, both surfaces of this uniaxially stretched film were subjected to corona discharge treatment in air to provide a base film having a surface wetting tension of 55 mN/m, and then the treated surfaces were coated with a coating liquid consisting of (a polyester resin with a glass transition temperature of 18° C.)/(a polyester resin with a glass transition temperature of 82° C.)/silica particles with an average particle diameter of 100 nm to form a transparent, slippery, and adhesive layer.

This uniaxially stretched film was introduced to a tenter, preheated in hot air at 135° C., and then stretched at a temperature of 140° C. 4.0 times in the horizontal direction at a uniform stretching speed. The stretched film was held in the tenter where it was heat-treated in hot air at 240° C., relaxed at that temperature by 3% in the width direction, subsequently cooled slowly at room temperature, and wound up. The resulting laminated film had a thickness of about 60 μm.

The resulting laminated film was in the form of a blue green film having a region where the reflectance was high at 430 to 600 nm. On the other hand, both the average reflectance in the wavelength range of 1,200 to 1,800 nm and that in the wavelength range of 900 to 1,800 nm were very high, namely, 78% and 75% respectively. Results are shown in Tables 1 to 4.

Example 1

A PEN polymer with an intrinsic viscosity of 0.60 and a Tm of 268° C. was used as thermoplastic resin C whereas a mixture of a copolymer of a PET resin with 30 mol % cyclohexanedimethanol and a polyethylene terephthalate polymer (manufactured by Toray Industries, Inc.; IV 0.65, Tg 79° C., Tm 255° C.) mixed at a mass ratio of 82:18 was used as thermoplastic resin D (shown as PETG resin in Tables), and the lamination apparatus was replaced with lamination apparatus 2. Except for these, the same procedure as in Comparative example 1 was carried out. Lamination apparatus 2 was designed for only a thick layer of 7 μm, a thick intermediate layer of 3 μm, both located at each surface, and lamination unit 2 containing 654 layers and configured to produce a laminated film having a total of 657 stacked layers in the following layer constitution: (thick surface layer of thermoplastic resin C)/(lamination unit 2 containing a total of 327 C-layers and D-layers stacked alternately in the thickness direction)/(thick intermediate layer of thermoplastic resin C)/(lamination unit 2 containing a total of 327 C-layers and D-layers stacked alternately in the thickness direction)/(thick surface layer of thermoplastic resin C). Each slit plate had gaps for lamination unit 2 containing 327 layers (711-constitution layer thickness ratio of 1:7:1), and each of the two slit plates were designed to produce layers to form thick intermediate films of 3 μm and 2 μm, allowing the thick intermediate layers to have a total thickness of 5 μm. The total layer thickness was about 60 μm. The layer thickness distribution in lamination apparatus 2 is illustrated in FIG. 5.

The resulting laminated film had a nearly reflection-free flat reflectance distribution and showed high transparency over the wavelength region of 400 to 800 nm in the visible light range, whereas both the average reflectance in the wavelength range of 1,200 to 1,800 nm and that in the wavelength range of 900 to 1,800 nm were 67% and 65%, respectively, which are lower than in Comparative example 1. Results are shown in Tables 1 to 4.

Comparative Example 2

Figure 6:
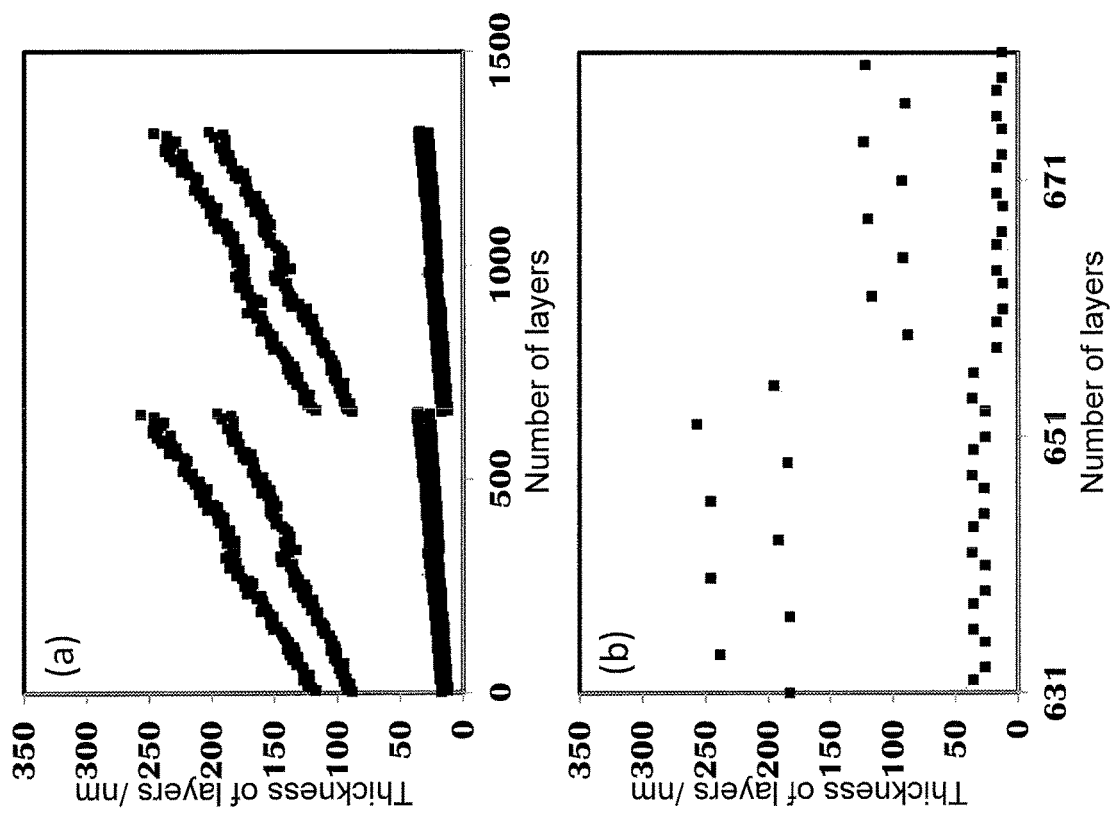
FIG. 6 (a) shows the distribution of the total thickness of the film in Comparative example 2 and (b) shows an enlarged view for layers 631 to 681.

A molten body produced by lamination apparatus 2 used in Example 1 was divided into two in the in-plane direction and stacked in the thickness direction to form a molten body containing 1313 layers (apparently one layer less because C-layers were combined in the thick layer), which was introduced to a T-die and molded into a sheet. Except for this, the same procedure as in Example 1 was carried out. The layer thickness distribution was as illustrated in FIG. 6.

The resulting laminated film had a thickness of 120 μm. Compared to the optical characteristics in Example 1, it was found that the visible light reflectance was maintained at a low level whereas the average reflectance in the wavelength range of 900 to 1,800 nm was higher. However, the axial rigidity was 46 N/m, resulting in faulty pasting on a glass plate with a curvature. Results are shown in Tables 1 to 4.

Example 2

Figure 7:
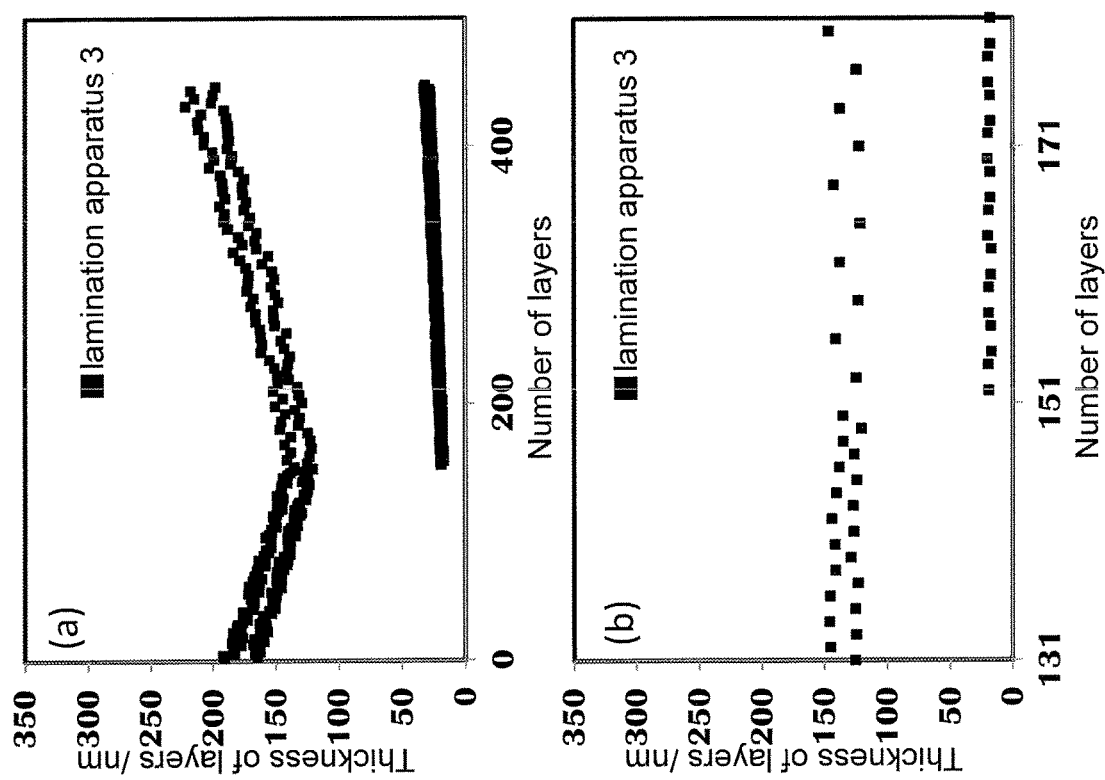
FIG. 7 (a) shows the distribution of the total thickness of the film observed when lamination apparatus 3 was used and (b) shows an enlarged view for layers 131 to 181.

Except for using lamination apparatus 3, the same procedure as in Example 1 was carried out. Lamination apparatus 3 had a layer thickness constitution designed for forming a 5 μm layer as a thick surface layer and lamination unit 1 of 149 layers, subsequently forming a thick intermediate layer of 5 μm and lamination unit 2 of 297 layers, and additionally forming a 5 μm layer as the thick surface layer on the lamination unit 2 side to produce a laminated film (total thickness of 60 μm) containing a total of 449 stacked layers in the following layer constitution: (thick surface layer of thermoplastic resin A)/(lamination unit 1 containing a total of 149 A-layers and B-layers stacked alternately in the thickness direction)/(thick intermediate layer of thermoplastic resin A)/(lamination unit 2 containing a total of 297 C-layers and D-layers stacked alternately in the thickness direction)/(thick surface layer of thermoplastic resin A). The total thickness (d1) of lamination unit 1 is 23 μm whereas the total thickness (d2) of lamination unit 2 is 21 μm, and accordingly d1/(d1+d2)=0.52. Here, one slit plate was used for each of lamination unit 1 and lamination unit 2. To allow the layers discharged through each slit plate to have thicknesses as close as possible to each other, a thick intermediate film of 2 μm to act as an A-layer was located on the lamination unit 1 side whereas a thick intermediate film of 3 μm to act as an A-layer was located on the lamination unit 2 side, totaling a thickness of 5 μm. Furthermore, in lamination apparatus 3, excluding the thick layers, mutually adjacent two layers in lamination unit 1 had a total thickness of 255 to 360 nm with a thickness ratio between the mutually adjacent two layers of 0.84 to 1.18. Mutually adjacent six layers in lamination unit 2 had a total thickness of 330 to 540 nm, and in comparison to the thinnest layer (having a thickness ratio of 1) of mutually adjacent three layers, the other layers had thickness ratios of 1 to 1.17 and 6.0 to 8.3 respectively. The layer thickness distribution in the lamination apparatus is illustrated in FIG. 7.

The resulting laminated film had a nearly reflection-free flat reflectance distribution over the wavelength region of 400 to 800 nm in the visible light range. Although the average reflectance in the wavelength range of 1,200 to 1,800 nm was lower than in Example 1, and it was possible to increase the reflectance in the wavelength range of 900 to 1,200 nm and accordingly, the average reflectance in the wavelength range of 900 to 1,800 nm was higher than in Example 1. As a result, in cases where the thicknesses were nearly the same, better heat shield performance (which is nearly equal to the rate of solar radiation heat acquisition) than in Example 1 was achieved. Results are shown in Tables 1 to 4.

Example 3

Except for using lamination apparatus 4, the same procedure as in Example 2 was carried out. Lamination apparatus 4 had a layer thickness constitution designed for forming a 6 μm layer as a thick surface layer and lamination unit 1 of 149 layers, subsequently forming a thick intermediate layer of 5 μm and lamination unit 2 of 357 layers, and additionally forming a 4 μm layer as the thick surface layer on the lamination unit 2 side to produce a laminated film (total thickness of 63 μm) containing a total of 599 stacked layers in the following layer constitution: (thick surface layer of thermoplastic resin A)/(lamination unit 1 containing a total of 149 A-layers and B-layers stacked alternately in the thickness direction)/(thick intermediate layer of thermoplastic resin A)/(lamination unit 2 containing a total of 357 C-layers and D-layers stacked alternately in the thickness direction)/(thick surface layer of thermoplastic resin A). The total thickness (d1) of lamination unit 1 is 23 μm whereas the total thickness (d2) of lamination unit 2 is 25 μm, and accordingly d1/(d1+d2)=0.47. Here, one slit plate was used for each of lamination unit 1 and lamination unit 2. To allow the layers discharged through each slit plate to have thicknesses as close as possible to each other, a thick intermediate film of 3 μm to act as an A-layer was located on the lamination unit 1 side whereas a thick intermediate film of 2 μm to act as an A-layer was located on the lamination unit 2 side, totaling a thickness of 5 μm. Furthermore, in lamination apparatus 3, excluding the thick layers, mutually adjacent two layers in lamination unit 1 had a total thickness of 260 to 360 nm with a thickness ratio between the mutually adjacent two layers of 0.84 to 1.18. Mutually adjacent six layers in lamination unit 2 had a total thickness of 340 to 540 nm, and in comparison to the thinnest layer (having a thickness ratio of 1) of mutually adjacent three layers, the other layers had thickness ratios of 1 to 1.17 and 6.6 to 8.2, respectively.

The resulting laminated film had a nearly reflection-free flat reflectance distribution over the wavelength region of 400 to 800 nm in the visible light range. Compare to Example 2, furthermore, the average reflectance in the wavelength range of 900 to 1,800 nm was higher and the reflectance in the wavelength range of 1,200 to 1,800 nm also improved. Results are shown in Tables 1 to 4.

Example 4

Figure 8:
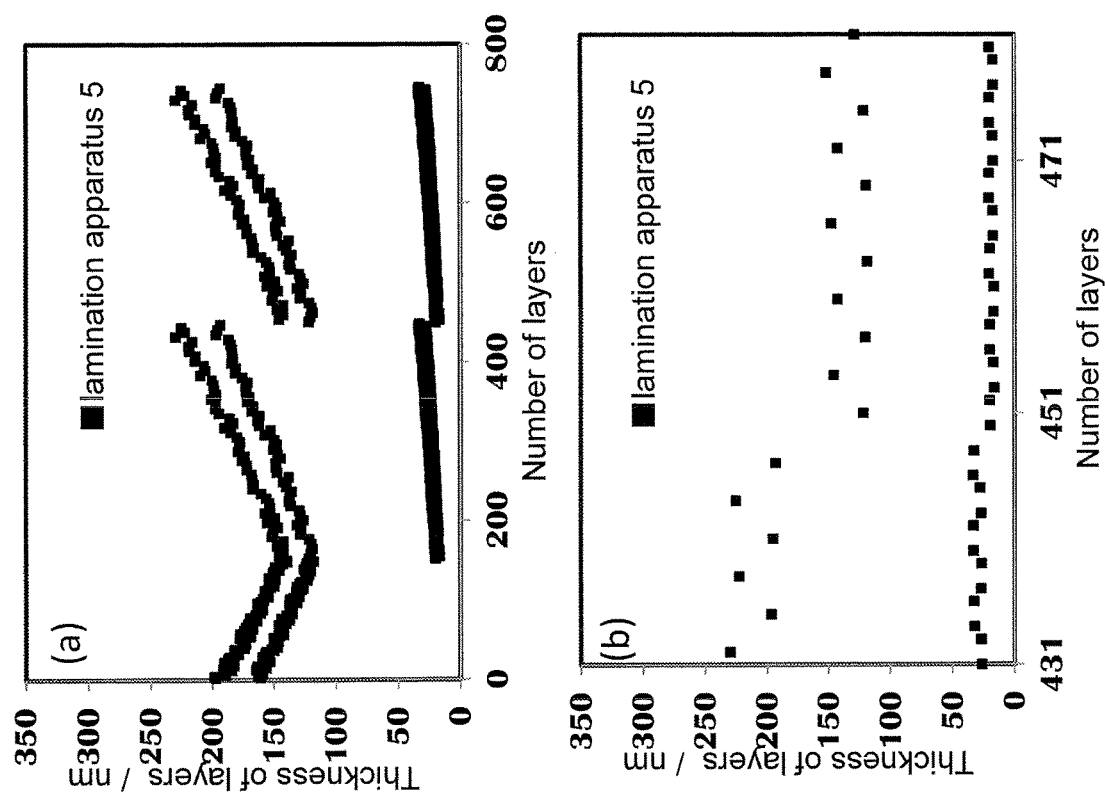
FIG. 8 (a) shows the distribution of the total thickness of the film observed when lamination apparatus 5 was used and (b) shows an enlarged view for layers 431 to 481.

Except for using lamination apparatus 5, the same procedure as in Example 2 was carried out. Lamination apparatus 5 had the same structure as lamination apparatus 2 but with an additional slit plate which had the same constitution as slit plate 2, totaling three slit plates. Thus, it had a layer thickness constitution designed for forming a 6 μm layer as a thick surface layer and lamination unit 1 of 149 layers, subsequently forming thick intermediate layer 1 of 5 μm, lamination unit 2 of 297 layers, thick intermediate layer 2 of 5 μm, and another lamination unit 2 of 297 layers, and additionally forming a 5 μm layer as the thick surface layer to produce a laminated film (total thickness of 86 μm) containing a total of 747 stacked layers in the following layer constitution: (thick surface layer of thermoplastic resin A)/(lamination unit 1 containing a total of 149 A-layers and B-layers stacked alternately in the thickness direction)/(thick intermediate layer 1 of thermoplastic resin A)/(lamination unit 2 containing a total of 297 C-layers and D-layers stacked alternately in the thickness direction)/(thick intermediate layer 2 of thermoplastic resin C)/(lamination unit 2 containing a total of 297 C-layers and D-layers stacked alternately in the thickness direction)/(thick surface layer of thermoplastic resin C). The total thickness (d1) of lamination unit 1 is 23 μm whereas the total thickness (d2) of lamination unit 2 is 43 μm, and accordingly d1/(d1+d2)=0.35. This included one lamination unit 1 and two slit plates for lamination unit 2, which were divided by thick intermediate layers. To allow the layers discharged through each slit plate to have thicknesses as close as possible to each other, appropriate layer thicknesses in the thick intermediate film region were adopted for adjustment (for example, a thick intermediate film of 1.5 μm to act as an A-layer was located on the lamination unit 1 side whereas a thick intermediate film of 3.5 μm to act as an A-layer was located on the lamination unit 2 side, totaling a thickness of 5 μm). Furthermore, in lamination apparatus 5, excluding the thick layers, mutually adjacent two layers in lamination unit 1 had a total thickness of 260 to 360 nm with a thickness ratio between the mutually adjacent two layers of 0.84 to 1.18. Mutually adjacent six layers in lamination unit 2 had a total thickness of 340 to 540 nm, and in comparison to the thinnest layer (having a thickness ratio of 1) of mutually adjacent three layers, the other layers had thickness ratios of 1 to 1.17 and 6.6 to 8.2, respectively. The layer thickness distribution in the lamination apparatus is illustrated in FIG. 8.

The resulting laminated film had a nearly reflection-free flat reflectance distribution over the wavelength region of 400 to 800 nm in the visible light range. Furthermore, the average reflectance in the wavelength range of 1,200 to 1,800 nm was higher than in Example 3, and a higher reflectance than in Example 2 was realized by increasing the proportion of lamination unit 2. In addition, a higher reflectance than in Example 3 was realized also in the wavelength range of 900 to 1,800 nm, resulting in a large heat shield effect. Results are shown in Tables 1 to 4.

Example 5

Figure 9:
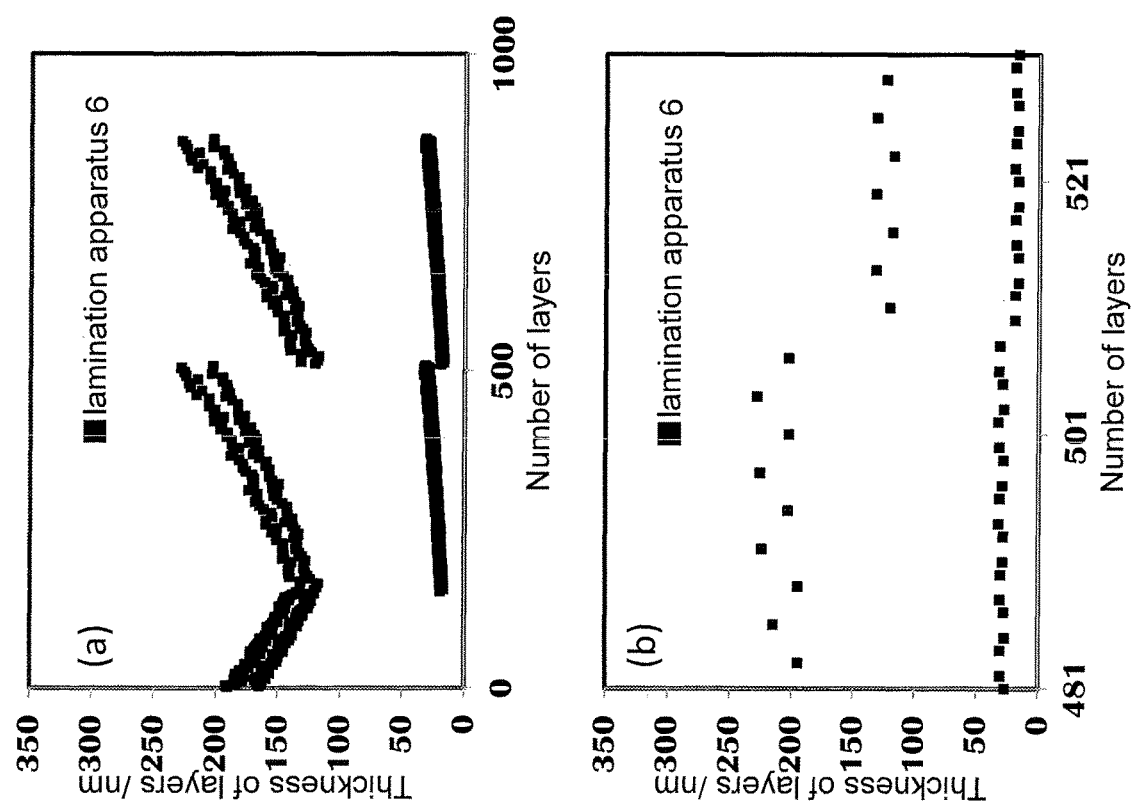
FIG. 9 (a) shows the distribution of the total thickness of the film observed when lamination apparatus 6 was used and (b) shows an enlarged view for layers 481 to 531.

Except for using lamination apparatus 6, the same procedure as in Example 2 was carried out. Lamination apparatus 6 was the same as the apparatus used in Example 4 except that each lamination unit 2 contained 357 layers, which were included in slit plates 2 and 3. Thus, it was designed for forming a 7 μm layer as a thick surface layer and lamination unit 1 of 149 layers, subsequently forming thick intermediate layer 1 of 5 μm, lamination unit 2 of 357 layers, thick intermediate layer 2 of 5 μm, and another lamination unit 2 of 357 layers, and additionally forming a 5 μm layer as the thick surface layer to produce a laminated film (total thickness of 99 μm) containing a total of 867 stacked layers in the following layer constitution: (thick surface layer of thermoplastic resin A)/(lamination unit 1 containing a total of 149 A-layers and B-layers stacked alternately in the thickness direction)/(thick intermediate layer 1 of thermoplastic resin A)/(lamination unit 2 containing a total of 357 C-layers and D-layers stacked alternately in the thickness direction)/(thick intermediate layer 2 of thermoplastic resin C)/(lamination unit 2 containing a total of 357 C-layers and D-layers stacked alternately in the thickness direction)/(thick surface layer of thermoplastic resin C). The total thickness (d1) of lamination unit 1 is 23 μm whereas the total thickness (d2) of lamination unit 2 is 55 μm, and accordingly d1/(d1+d2)=0.29. This included one lamination unit 1 and two slit plates for lamination unit 2, which were divided by thick intermediate layers. To allow the layers discharged through each slit plate to have thicknesses as close as possible to each other, appropriate layer thicknesses in the thick intermediate film region were adopted for adjustment (for example, a thick intermediate film of 3 μm to act as an A-layer was located on the lamination unit 1 side whereas a thick intermediate film of 2 μm to act as an A-layer was located on the lamination unit 2 side, totaling a thickness of 5 μm). Furthermore, in lamination apparatus 5, excluding the thick layers, mutually adjacent two layers in lamination unit 1 had a total thickness of 260 to 360 nm with a thickness ratio between the mutually adjacent two layers of 0.84 to 1.18. Mutually adjacent six layers in lamination unit 2 had a total thickness of 340 to 540 nm, and in comparison to the thinnest layer (having a thickness ratio of 1) of mutually adjacent three layers, the other layers had thickness ratios of 1 to 1.17 and 6.6 to 8.2, respectively. The layer thickness distribution in the lamination apparatus is illustrated in FIG. 9.

The resulting laminated film had a nearly reflection-free flat reflectance distribution over the wavelength region of 400 to 800 nm in the visible light range. Compare to Example 1, furthermore, the average reflectance in the wavelength range of 900 to 1,800 nm was higher, representing good optical characteristics. Results are shown in Tables 1 to 4.

Example 6

Figure 10:
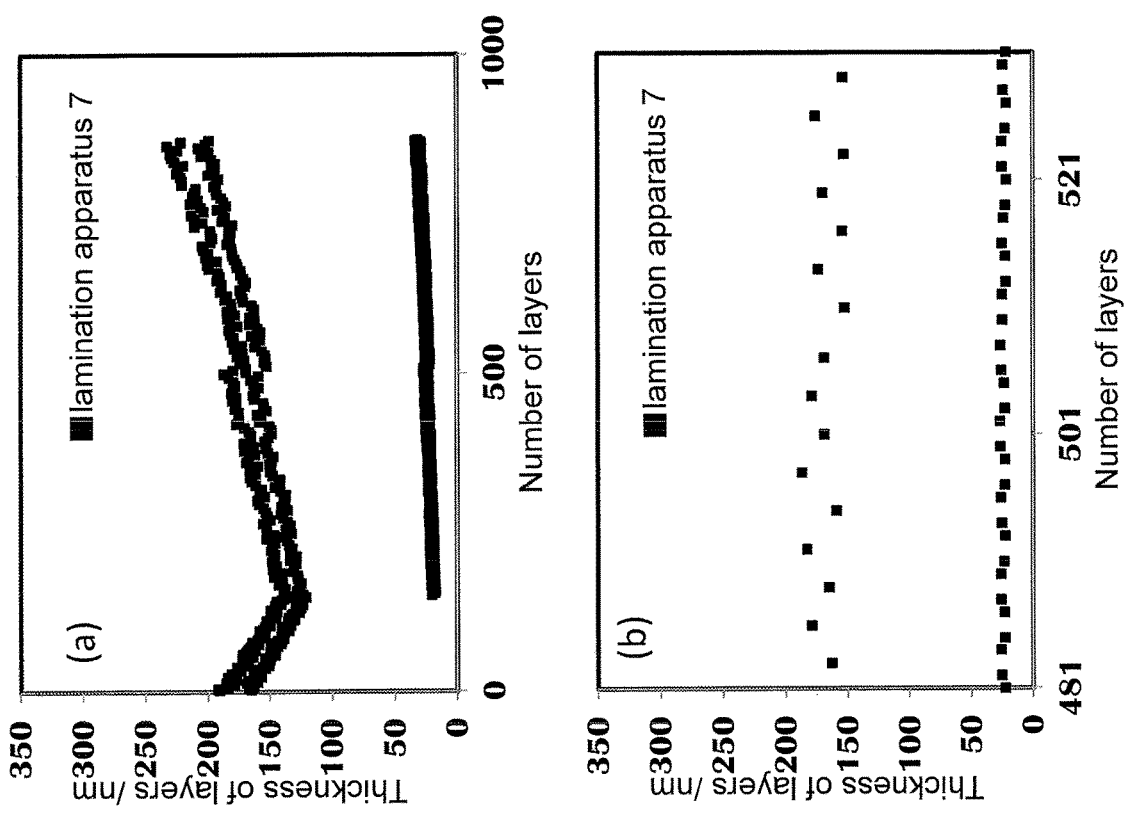
FIG. 10 (a) shows the distribution of the total thickness of the film observed when lamination apparatus 7 was used and (b) shows an enlarged view for layers 481 to 531.

Except for using lamination apparatus 7, the same procedure as in Example 2 was carried out. Lamination apparatus 7 had the same structure as the apparatus used in Example 5 except that the layer arrangements in slit plates were changed from the constitution shown in FIG. 9 to the one in FIG. 10. Accordingly, slit plate 2 was designed for reflection in the wavelength range of 1,050 to 1,400 nm whereas slit plate 3 was designed for reflection in the wavelength range of 1,350 to 1,800 nm. This results in a laminated film having a total of 867 stacked layers (a total thickness 95 μm). The total thickness (d1) of lamination unit 1 is 23 μm whereas the total thickness (d2) of lamination unit 2 is 52 μm, and accordingly d1/(d1+d2)=0.30. This included one lamination unit 1 and two slit plates for lamination unit 2, which were divided by thick intermediate layers. To allow the layers discharged through each slit plate to have thicknesses as close as possible to each other, appropriate layer thicknesses in the thick intermediate film region were adopted for adjustment (for example, a thick intermediate film of 3 μm to act as an A-layer was located on the lamination unit 1 side whereas a thick intermediate film of 2 μm to act as an A-layer was located on the lamination unit 2 side, totaling a thickness of 5 μm). Furthermore, in lamination apparatus 5, excluding the thick layers, mutually adjacent two layers in lamination unit 1 had a total thickness of 260 to 360 nm with a thickness ratio between the mutually adjacent two layers of 0.84 to 1.18. Mutually adjacent six layers in lamination unit 2 had a total thickness of 340 to 540 nm, and in comparison to the thinnest layer (having a thickness ratio of 1) of mutually adjacent three layers, the other layers had thickness ratios of 1 to 1.17 and 6.6 to 8.2, respectively.

The resulting laminated film had a nearly reflection-free flat reflectance distribution over the wavelength region of 400 to 800 nm in the visible light range. In addition, the reflectance in the range of 1,200 to 1,800 nm was higher than in Example 5. Results are shown in Tables 1 to 4.

Example 7

Except for using lamination apparatus 8, the same procedure as in Example 2 was carried out. Lamination apparatus 8 had a layer thickness constitution designed for forming a 2 μm layer as a thick surface layer and lamination unit 1 of 149 layers, subsequently forming a thick intermediate layer of 5 μm and lamination unit 2 of 183 layers, and additionally forming a 8 μm layer as the thick surface layer on the lamination unit 2 side to produce a laminated film (total thickness of 48 μm) containing a total of 339 stacked layers in the following layer constitution: (thick surface layer of thermoplastic resin A)/(lamination unit 1 containing a total of 149 A-layers and B-layers stacked alternately in the thickness direction)/(thick intermediate layer of thermoplastic resin A)/(lamination unit 2 containing a total of 183 C-layers and D-layers stacked alternately in the thickness direction)/(thick surface layer of thermoplastic resin A). The total thickness (d1) of lamination unit 1 is 23 μm whereas the total thickness (d2) of lamination unit 2 is 10 μm, and accordingly d1/(d1+d2)=0.63. Here, one slit plate was used for each of lamination unit 1 and lamination unit 2. To allow the layers discharged through each slit plate to have thicknesses as close as possible to each other, a thick intermediate film of 1 μm to act as an A-layer was located on the lamination unit 1 side whereas a thick intermediate film of 4 μm to act as an A-layer was located on the lamination unit 2 side, totaling a thickness of 5 μm. Furthermore, in lamination apparatus 8, excluding the thick layers, mutually adjacent two layers in lamination unit 1 had a total thickness of 260 to 360 nm with a thickness ratio between the mutually adjacent two layers of 0.84 to 1.18. Mutually adjacent six layers in lamination unit 2 had a total thickness of 340 to 540 nm, and in comparison to the thinnest layer (having a thickness ratio of 1) of mutually adjacent three layers, the other layers had thickness ratios of 1 to 1.17 and 6.6 to 8.2, respectively.

The resulting laminated film had a nearly reflection-free flat reflectance distribution over the wavelength region of 400 to 800 nm in the visible light range. Probably due to a smaller number of layers in the 711 constitution, however, although a band where the reflection was 30% or more existed in the range of 1,200 to 1,800 nm, the reflectance was low and, as result, the average reflectance in the wavelength range of 900 to 1,800 nm was lower than in Example 2. Results are shown in Tables 1 to 4.

Comparative Example 3

Except for using lamination apparatus 9, the same procedure as in Example 2 was carried out. Lamination apparatus 9 was constructed by adopting only slit plate 1 that was contained in lamination apparatus 8 and used as new lamination apparatus (only lamination unit 1).

Due to the disappearance of the reflection in the range of 1,200 to 1,800 nm that existed in Example 7, the resulting laminated film had a lower average reflectance in the range of 900 to 1,800 nm. Consequently, the rate of solar radiation heat acquisition was as high as 72%. From these results, it was found, as seen from the comparison between Comparative example 3 and Example 7, that the inclusion of a slight number of layers in the 711 constitution can lead to an increase in the rate of solar radiation heat acquisition. Results are shown in Tables 1 to 4.

Due to a small axial rigidity, furthermore, the film itself was so brittle and low in handleability that it was impossible to extend the film properly and paste it on a curved glass surface in the pasting test.

Example 8

Except for using lamination apparatus 10, the same procedure as in Example 2 was carried out. The layer thickness constitution in lamination apparatus 9 is the same as that in lamination apparatus 2 except that 46 layers for lamination unit 1 are formed after a 5 μm thick surface layer in slit plate 1. Here, mutually adjacent two layers in lamination unit 1 had a total thickness of 263 to 347 nm with a thickness ratio between the mutually adjacent two layers of 0.84 to 1.18, and it was designed so as to reflect light in the wavelength range of 900 to 1,050 nm. Lamination unit 1, furthermore, had the same layer thickness distribution as in Example 1 and it was designed so as to reflect light in the wavelength range of 900 to 1,800 nm.

The resulting laminated film had a nearly reflection-free flat reflectance distribution over the wavelength region of 400 to 800 nm in the visible light range. Compared to Example 1, it was found that the combination of lamination unit 1 with the structure in Example 1 acted to realize a high reflectance in the wavelength range of 900 to 1,200 nm, and accordingly the reflectance in the wavelength range of 900 to 1,800 nm increased, resulting in a lower rate of solar radiation heat acquisition. Results are shown in Tables 1 to 4.

Example 9

Except that a copolymer of PEN with 10 mol % of neopentyl glycol with an intrinsic viscosity 0.60 and a Tm of 247° C. (hereinafter PEN/NPG(10)) was used as thermoplastic resins A and C whereas a PET resin copolymerized with 30 mol % of cyclohexanedimethanol (shown as PETG in Tables) was used as thermoplastic resins B and D, the same procedure as in Example 6 was carried out. Here, the refractive index in the non-oriented state of PEN was 1.64 and that of the PETG resin was 1.56.

As a result of an increase in the difference in refractive index, the resulting laminated film showed an increased reflectance in the wavelength range of 900 to 1,200 m, and the rate of solar radiation heat acquisition was also higher. Furthermore, the axial rigidity was 26 N/m, allowing the film to be pasted on a glass surface properly. Results are shown in Tables 1 to 4.

Example 10

A resin prepared by adding a polybutylene terephthalate based resin to about 5% as a viscosity adjustor to PEN/NPG (shown as PEN/NPG+PBT resin in Tables) was used as thermoplastic resins A and C whereas a mixture of a copolymer of a PET resin with 21 mol % of spiroglycol and 15 mol % of cyclohexanedicarboxylic acid and a polyethylene terephthalate polymer (manufactured by Toray Industries, Inc.; IV 0.65, Tg 79° C., Tm 255° C.) mixed at a ratio of 82:18 (shown as SPG resin in Tables) was used as thermoplastic resins B and D, and except for this, the same procedure as in Example 9 was carried out. The PEN/NPG+PBT resin in the non-oriented state had a refractive index 1.64 and the SPG resin had a refractive index of 1.55.

As a result of an increase in the difference in refractive index, the resulting laminated film showed an increased reflectance in the wavelength range of 900 to 1,200 m, and the rate of solar radiation heat acquisition was also higher. Furthermore, the axial rigidity was 26 N/m, allowing the film to be pasted on a glass surface properly. Results are shown in Tables 1 to 4.

Example 11

Except for using a polyethylene terephthalate (PET) resin with an IV of 0.65 as thermoplastic resins A and C and stretching the PET resin for film production, the same procedure was carried out. The PET stretching for film production was carried out under the conditions of a longitudinal stretching temperature of 90° C., a stretching ratio of 3.3, a transverse stretching temperature of 110° C., transverse stretching ratio of 4.0, and a heat treatment temperature of 240° C. In the non-oriented state, the PET and SPG resins had refractive index values of 1.60 and 1.55, respectively.

The resulting laminated film was so small in the difference in refractive index that the reflectance was inferior compared to Examples 9 and 10. However, uniform reflection was realized in the range of 900 to 1,800 nm, and it was possible to paste the film on a glass surface properly. Results are shown in Tables 1 to 4.

Example 12

Figure 11:
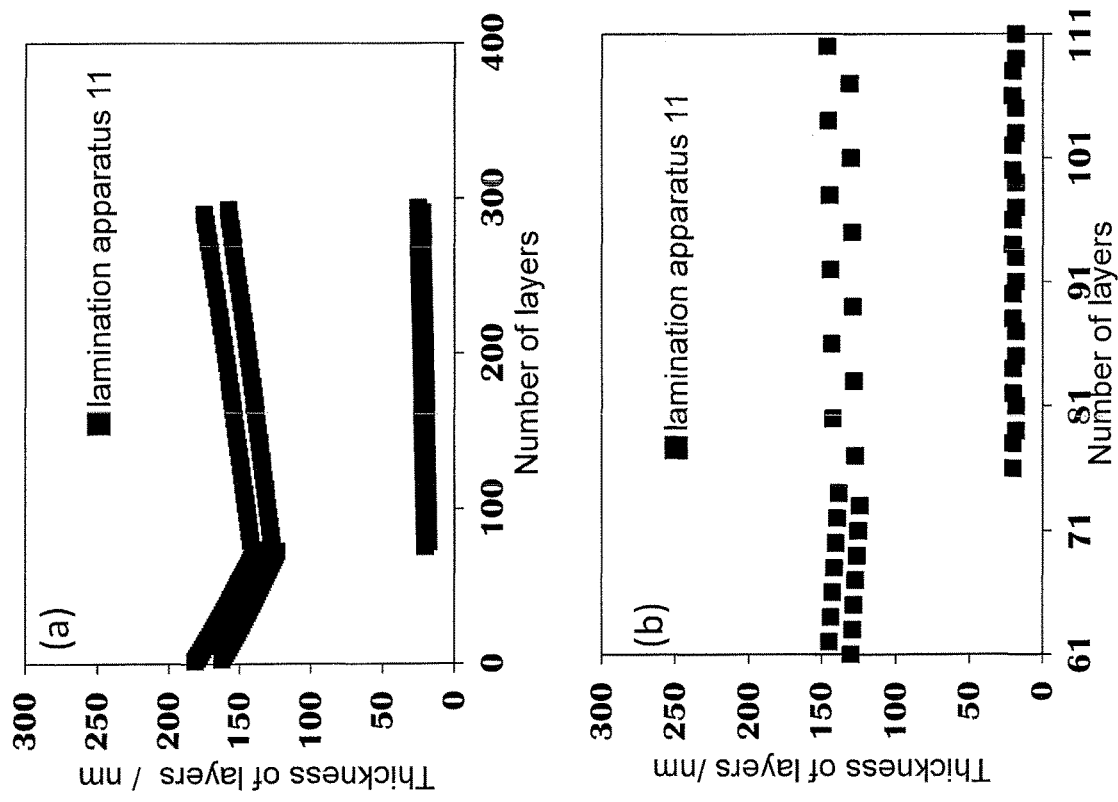
FIG. 11 (a) shows the distribution of the total thickness of the film observed when lamination apparatus 11 was used and (b) shows an enlarged view for layers 61 to 111.

In Example 12 and the subsequent Examples, the procedure was designed to realize a reflection band in the range of 900 to 1400 nm. Here, except for using lamination apparatus 11, the same procedure as in Example 1 was carried. The film obtained by lamination apparatus 11 was in the form of a laminated film (total thickness of 40 μm) containing a total of 295 stacked layers produced by forming a 5 μm layer at each surface and lamination unit 1 of 73 layers, and subsequently forming a thick intermediate layer of 5 μm and lamination unit 2 of 219 layers, and had the following layer constitution: (thick surface layer of thermoplastic resin A)/(lamination unit 1 containing a total of 73 A-layers and B-layers stacked alternately in the thickness direction)/(thick intermediate layer of thermoplastic resin A)/(lamination unit 2 containing a total of 219 C-layers and D-layers stacked alternately in the thickness direction)/(thick surface layer of thermoplastic resin A). The total thickness (d1) of lamination unit 1 is 11 μm whereas the total thickness (d2) of lamination unit 2 is 14 μm, and accordingly d1/(d1+d2)=0.44. Here, one slit plate was used for each of lamination unit 1 and lamination unit 2. To allow the layers discharged through each slit plate to have proper thicknesses, a design was set up so that a thick intermediate film of 4 μm to act as an A-layer was located on the lamination unit 1 side whereas a thick intermediate film of 1 μm to act as an A-layer was located on the lamination unit 2 side, totaling a thickness of 5 μm. The layer thickness distribution in lamination apparatus 11 is illustrated in FIG. 11. In lamination apparatus 11, excluding the thick layers, mutually adjacent two layers in lamination unit 1 had a total thickness of 260 to 350 nm with a thickness ratio between the mutually adjacent two layers of 0.89 to 1.11. Mutually adjacent six layers in lamination unit 2 had a total thickness of 345 to 430 nm, and in comparison to the thinnest layer (having a thickness ratio of 1) of mutually adjacent three layers, the other layers had thickness ratios of 1 to 1.2 and 6.2 to 7.9 respectively.

The resulting laminated film had a reflection band in the range of 900 to 1400 nm, and it was almost free of flow marks and transparent with a high transmittance in the wavelength region of 400 to 800 nm in the visible light range. Its reflection band was narrow and its reflectance was low, resulting in a small rate of solar radiation heat acquisition. However, the film itself was thin and encountered no problems during pasting on a glass surface. Results are shown in Tables 5 to 8.

Example 13

Except for using lamination apparatus 12, the same procedure as in Example 12 was carried out. Lamination apparatus 12 was designed to produce a film having a layer thickness constitution that was almost the same as that of the film obtained from lamination apparatus 11, and configured for forming an 8 μm layer as a thick surface layer and lamination unit 1 of 53 layers, subsequently forming a thick intermediate layer of 5 μm and lamination unit 2 of 255 layers, and additionally forming a 2 μm layer as the thick surface layer on the lamination unit 2 side to produce a laminated film (total thickness of 40 μm) containing a total of 311 stacked layers in the following layer constitution: (thick surface layer of thermoplastic resin A)/(lamination unit 1 containing a total of 53 A-layers and B-layers stacked alternately in the thickness direction)/(thick intermediate layer of thermoplastic resin A)/(lamination unit 2 containing a total of 255 C-layers and D-layers stacked alternately in the thickness direction)/(thick surface layer of thermoplastic resin A). The total thickness (d1) of lamination unit 1 is 8 μm whereas the total thickness (d2) of lamination unit 2 is 17 μm, and accordingly d1/(d1+d2)=0.32. To allow the layers discharged through each slit plate to have proper thicknesses, a design was set up so that a layer of 4 μm to act as an A-layer was located on the lamination unit 1 side whereas a layer of 1 μm was located on the lamination unit 2 side, totaling a thickness of 5 μm. Furthermore, in lamination apparatus 12, excluding the thick layers, mutually adjacent two layers in lamination unit 1 had a total thickness of 260 to 350 nm with a thickness ratio between the mutually adjacent two layers of 0.89 to 1.11. Mutually adjacent six layers in lamination unit 2 had a total thickness of 345 to 430 nm, and in comparison to the thinnest layer (having a thickness ratio of 1) of mutually adjacent three layers, the other layers had thickness ratios of 1 to 1.2 and 6.2 to 7.8, respectively.

The resulting laminated film suffered from some flow marks, but the reflectance in the range of 900 to 1,200 nm was lower than in Example 12, resulting in a smaller rate of solar radiation heat acquisition. Results are shown in Tables 5 to 8.

Example 14

Except for using lamination apparatus 13, the same procedure as in Example 12 was carried out. Lamination apparatus 13 was designed to produce a film having a layer thickness constitution that was almost the same as that of the film obtained from lamination apparatus 11, and configured for forming an 8 μm layer as a thick surface layer and lamination unit 1 of 35 layers, subsequently forming a thick intermediate layer of 5 μm and lamination unit 2 of 297 layers, and additionally forming a 2 μm layer as the thick surface layer on the lamination unit 2 side to produce a laminated film (total thickness of 40 μm) containing a total of 335 stacked layers in the following layer constitution: (thick surface layer of thermoplastic resin A)/(lamination unit 1 containing a total of 35 A-layers and B-layers stacked alternately in the thickness direction)/(thick intermediate layer of thermoplastic resin A)/(lamination unit 2 containing a total of 297 C-layers and D-layers stacked alternately in the thickness direction)/(thick surface layer of thermoplastic resin A). The total thickness (d1) of lamination unit 1 is 5 μm whereas the total thickness (d2) of lamination unit 2 is 20 μm, and accordingly d1/(d1+d2)=0.20. Here, one slit plate was used for each of lamination unit 1 and lamination unit 2. To allow the layers discharged through each slit plate to have thicknesses as close as possible to each other, a thick intermediate film of 4 μm to form an A-layer was located on the lamination unit 1 side whereas a thick intermediate film of 1 μm to form an A-layer was located on the lamination unit 2 side, totaling a thickness of 5 μm. Furthermore, in lamination apparatus 5, excluding the thick layers, mutually adjacent two layers in lamination unit 1 had a total thickness of 260 to 350 nm with a thickness ratio between the mutually adjacent two layers of 0.89 to 1.11. Mutually adjacent six layers in lamination unit 2 had a total thickness of 345 to 430 nm, and in comparison to the thinnest layer (having a thickness ratio of 1) of mutually adjacent three layers, the other layers had thickness ratios of 1 to 1.2 and 6.1 to 7.8, respectively.

The resulting laminated film suffered from some flow marks, but the transmittance in the visible light range of 400 to 800 nm was high, resulting in a film with a high transparency. On the other hand, the reflectance of light in the wavelength range of 900 to 1,200 nm was significant low and accordingly, the average reflectance in the wavelength range of 900 to 1400 nm was lower than in Comparative example 2, resulting in a lower rate of solar radiation heat acquisition. Results are shown in Tables 5 to 8.

Example 15

Except for using lamination apparatus 14, the same procedure as in Example 12 was carried out. Lamination apparatus 14 was designed to produce a film having a layer thickness constitution that was almost the same as that of the film obtained from lamination apparatus 11, and configured for forming a 2 μm layer as thick surface layer and lamination unit 1 of 149 layers, subsequently forming a thick intermediate layer of 5 μm and lamination unit 2 of 45 layers, and additionally forming a 8 μm layer as the thick surface layer on the lamination unit 2 side to produce a laminated film (total thickness of 40 μm) containing a total of 197 stacked layers in the following layer constitution: (thick surface layer of thermoplastic resin A)/(lamination unit 1 containing a total of 149 A-layers and B-layers stacked alternately in the thickness direction)/(thick intermediate layer of thermoplastic resin A)/(lamination unit 2 containing a total of 45 C-layers and D-layers stacked alternately in the thickness direction)/(thick surface layer of thermoplastic resin A). The total thickness (d1) of lamination unit 1 is 22 μm whereas the total thickness (d2) of lamination unit 2 is 5 μm, and accordingly d1/(d1+d2)=0.88. Here, one slit plate was used for each of lamination unit 1 and lamination unit 2. To allow the layers discharged through each slit plate to have thicknesses as close as possible to each other, a thick intermediate film of 4 μm to form an A-layer was located on the lamination unit 1 side whereas a thick intermediate film of 1 μm to form an A-layer was located on the lamination unit 2 side, totaling a thickness of 5 μm. Furthermore, in lamination apparatus 5, excluding the thick layers, mutually adjacent two layers in lamination unit 1 had a total thickness of 260 to 350 nm with a thickness ratio between the mutually adjacent two layers of 0.89 to 1.11. Mutually adjacent six layers in lamination unit 2 had a total thickness of 345 to 430 nm, and in comparison to the thinnest layer (having a thickness ratio of 1) of mutually adjacent three layers, the other layers had thickness ratios of 1 to 1.2 and 6.1 to 7.8, respectively.

Though suffering from some flow marks, the resulting laminated film had a nearly reflection-free flat reflectance distribution over the wavelength region of 400 to 800 nm in the visible light range. On the other hand, the reflectance of light in the wavelength range of 900 to 1,200 nm was significantly large, resulting in a better rate of solar radiation heat acquisition than in Example 12. Compared to this, the reflectance in the wavelength range of 1,200 nm to 1400 nm was significantly low, resulting in a lower average reflectance in the wavelength range of 1,200 to 1,800 nm. Results are shown in Tables 5 to 8.

Example 16

Except for using lamination apparatus 15, the same procedure as in Example 12 was carried out. Lamination apparatus 15 was designed to produce a film having a layer thickness constitution that was almost the same as that of the film obtained from lamination apparatus 11, and configured for forming an 6 μm layer as a surface layer and lamination unit 1 of 99 layers, subsequently forming a thick intermediate layer of 5 μm and lamination unit 2 of 297 layers, and additionally forming a 4 μm layer as the thick surface layer on the lamination unit 2 side to produce a laminated film (total thickness of 50 μm) containing a total of 399 stacked layers in the following layer constitution: (thick surface layer of thermoplastic resin A)/(lamination unit 1 containing a total of 99 A-layers and B-layers stacked alternately in the thickness direction)/(thick intermediate layer of thermoplastic resin A)/(lamination unit 2 containing a total of 297 C-layers and D-layers stacked alternately in the thickness direction)/(thick surface layer of thermoplastic resin A). The total thickness (d1) of lamination unit 1 is 15 µm whereas the total thickness (d2) of lamination unit 2 is 20 µm, and accordingly d1/(d1+d2)=0.43. Here, one slit plate was used for each of lamination unit 1 and lamination unit 2. Furthermore, excluding the thick layers when using lamination apparatus 15, mutually adjacent two layers in lamination unit 1 had a total thickness of 260 to 350 nm with a thickness ratio between the mutually adjacent two layers of 0.89 to 1.11. Mutually adjacent six layers in lamination unit 2 had a total thickness of 345 to 430 nm, and in comparison to the thinnest layer (having a thickness ratio of 1) of mutually adjacent three layers, the other layers had thickness ratios of 1 to 1.2 and 6.1 to 8.0, respectively.

The resulting laminated film was almost free of flow marks as in the case of Example 12, and had a nearly reflection-free flat reflectance distribution over the wavelength region of 400 to 800 nm in the visible light range. The reflectance in the wavelength range of 900 to 1,800 nm was higher than in Example 12, and the rate of solar radiation heat acquisition was better than in Example 12. Results are shown in Tables 5 to 8.

Example 17

Except for using lamination apparatus 16, the same procedure as in Example 12 was carried out. Lamination apparatus 16 was designed to produce a film having a layer thickness constitution that was almost the same as that of the film obtained from lamination apparatus 16, and configured for forming an 8 µm layer as a surface layer and lamination unit 1 of 149 layers, subsequently forming a thick intermediate layer of 5 µm and lamination unit 2 of 447 layers, and additionally forming a 4 µm layer as the thick surface layer on the lamination unit 2 side to produce a laminated film (total thickness of 68 µm) containing a total of 599 stacked layers in the following layer constitution: (thick surface layer of thermoplastic resin A)/(lamination unit 1 containing a total of 149 A-layers and B-layers stacked alternately in the thickness direction)/(thick intermediate layer of thermoplastic resin A)/(lamination unit 2 containing a total of 447 C-layers and D-layers stacked alternately in the thickness direction)/(thick surface layer of thermoplastic resin A). The total thickness (d1) of lamination unit 1 is 22 µm whereas the total thickness (d2) of lamination unit 2 is 29 µm, and accordingly d1/(d1+d2)=0.43. Furthermore, in lamination apparatus 8, excluding the thick layers, mutually adjacent two layers in lamination unit 1 had a total thickness of 260 to 350 nm with a thickness ratio between the mutually adjacent two layers of 0.89 to 1.11. Mutually adjacent six layers in lamination unit 2 had a total thickness of 345 to 430 nm, and in comparison to the thinnest layer (having a thickness ratio of 1) of mutually adjacent three layers, the other layers had thickness ratios of 1 to 1.2 and 6.1 to 8.0, respectively.

The resulting laminated film was almost free of flow marks as in the case of Example 12, and had a nearly reflection-free flat reflectance distribution over the wavelength region of 400 to 800 nm in the visible light range. The reflectance in the wavelength range of 900 to 1,800 nm was higher than in Example 12, and the rate of solar radiation heat acquisition was better than in Example 13. Results are shown in Tables 5 to 8.

Comparative Example 4

The apparatus used (lamination apparatus 17) was similar to lamination apparatus 15 but configured to produce a film containing a lamination unit 2 with a layer thickness ratio of 1:5:1, and the lamination unit 2 was such that in comparison to the thinnest layer (having a thickness ratio of 1) of mutually adjacent three layers, the other layers had thickness ratios of 1 to 1.2 and 4.5 to 6, respectively. Except for this, the same procedure as in Example 16 was carried out.

The resulting laminated film was free of flow marks as in the case of Example 16, but the reflectance improved undesirably in the wavelength region of 400 to 450 nm in the visible light range. Results are shown in Tables 5 to 8.

Example 18

The apparatus used (lamination apparatus 18) was similar to lamination apparatus 15 but configured to produce a film containing a lamination unit 2 with a layer thickness ratio of 1:6:1, and the lamination unit 2 was such that in comparison to the thinnest layer (having a thickness ratio of 1) of mutually adjacent three layers, the other layers had thickness ratios of 1 to 1.2 and 5.3 to 7, respectively. Except for this, the same procedure as in Example 16 was carried out.

The resulting laminated film was free of flow marks as in the case of Example 16, but the reflectance slightly increased undesirably in the wavelength region of 400 to 450 nm in the visible light range, although it was possible to maintain a sufficiently high transparency. Results are shown in Tables 5 to 8.

Example 19

The apparatus used (lamination apparatus 19) was similar to lamination apparatus 15 but configured to produce a film containing a lamination unit 2 with a layer thickness ratio of 1:8:1, and the lamination unit 2 was such that in comparison to the thinnest layer (having a thickness ratio of 1) of mutually adjacent three layers, the other layers had thickness ratios of 1 to 2 and 7.0 to 9.3, respectively. Except for this, the same procedure as in Example 16 was carried out.

The resulting laminated film was free of flow marks as in the case of Example 16, but the reflectance slightly increased undesirably in the wavelength region of 400 to 450 nm in the visible light range, although it was possible to maintain a sufficiently high transparency. Results are shown in Tables 5 to 8.

Comparative Example 5

The apparatus used (lamination apparatus 20) was similar to lamination apparatus 15 but configured to produce a film containing a lamination unit 2 with a layer thickness ratio of 1:9:1, and the lamination unit 2 was such that in comparison to the thinnest layer (having a thickness ratio of 1) of mutually adjacent three layers, the other layers had thickness ratios of 1 to 2 and 7.9 to 10.5, respectively. Except for this, the same procedure as in Example 16 was carried out.

The resulting laminated film was free of flow marks as in the case of Example 16, and the reflectance improved undesirably in the wavelength region of 400 to 450 nm in the visible light range. Results are shown in Tables 5 to 8.

Example 20

The apparatus used (lamination apparatus 21) was similar to lamination apparatus 15 but configured to produce a film containing a lamination unit 2 with a layer thickness ratio of 1:7:1.3, and the lamination unit 2 was such that in comparison to the thinnest layer (having a thickness ratio of 1) of mutually adjacent three layers, the other layers had thickness ratios of 1 to 5 and 6.1 to 8.0, respectively. Except for this, the same procedure as in Example 16 was carried out.

The resulting laminated film was free of flow marks as in the case of Example 12, but the reflectance slightly increased undesirably in the wavelength region of 400 to 450 nm in the visible light range, although it was possible to maintain a sufficiently high transparency. Results are shown in Tables 5 to 8.

Comparative Example 6

The apparatus used (lamination apparatus 22) was similar to lamination apparatus 15 but configured to produce a film containing a lamination unit 2 with a layer thickness ratio of 1:7:1.4, and the lamination unit 2 was such that in comparison to the thinnest layer (having a thickness ratio of 1) of mutually adjacent three layers, the other layers had thickness ratios of 1 to 6 and 6.1 to 8.0, respectively. Except for this, the same procedure as in Example 16 was carried out.

The resulting laminated film was free of flow marks as in the case of Example 16, and the reflectance improved undesirably in the wavelength region of 400 to 450 nm in the visible light range. Results are shown in Tables 5 to 8.

Comparative Example 7

The apparatus used (lamination apparatus 23) was similar to lamination apparatus 15 but configured to produce a film containing a lamination unit 1 with a lamination ratio (A/B) of 0.65, and mutually adjacent layers in the lamination unit 1 had thicknesses of 0.65 to 1.55. Except for this, the same procedure as in Example 16 was carried out.

The resulting laminated film was free of flow marks as in the case of Example 12, but the reflectance increased undesirably in the wavelength region of 400 to 450 nm in the visible light range, causing the film to look blue. Results are shown in Tables 5 to 8.

Example 21

The apparatus used (lamination apparatus 24) was similar to lamination apparatus 16 but configured to produce a film characterized as follows: each of the surface layers had a thickness of 0.5 μm; slit plate 1 contained a thick intermediate layer of 8 μm whereas slit plate 2 contained a thick intermediate layer of 1 μm, adding up to a total thick intermediate layer thickness of 9 μm. Except for this, the same procedure as in Example 17 was carried out. The film obtained had a total thickness of 61 μm.

The resulting laminated film suffered from slight flow marks as in the case of Example 12 and large spectroscopic unevenness in the width direction (the direction perpendicular to the film's length direction), which suggested a deterioration in lamination accuracy. The optical characteristics in the central portion of the film were similar to those in Example 3. Results are shown in Tables 5 to 8.

Comparative Example 8

The apparatus used (lamination apparatus 25) was similar to lamination apparatus 16 but configured for film production as follows: a thick intermediate layer of 0.5 μm was to be formed in each plate to realize a total thick intermediate layer thickness of 1 μm, and the thick surface layer in lamination unit 1 had a thickness of 12 μm whereas the thick surface layer in lamination unit 2 had a thickness of 5 μm to allow the layers discharged from plate 1 and plate 2 to have the same thickness. Except for this, the same procedure as in Example 17 was carried out. The film obtained had a total thickness of 69 μm.

Unlike the case in Example 17, the resulting laminated film suffered from the formation of a significant number of flow marks. It was impossible to measure the physical properties of the sample properly.

So, the resin extrusion temperature was adjusted to 320° C. for PEN and 300° C. for the PETG resin to allow them to have different resin viscosities with the aim of preventing the formation of flow marks. However, a large heat transfer occurred between the two resin streams at the confluence to cause a deterioration in lamination accuracy. As a result, mutually adjacent two layers in lamination unit 1 had a thickness ratio of 0.73 to 1.3 whereas lamination unit 2 was such that in comparison to the thinnest layer (having a thickness ratio of 1) of mutually adjacent three layers, the other two layers had thickness ratios of 1 to 1.5 and 5.0 to 10.5, respectively. The resulting laminated film showed a high reflectance in the visible light range. Results are shown in Tables 5 to 8.

Example 22

Figure 12:
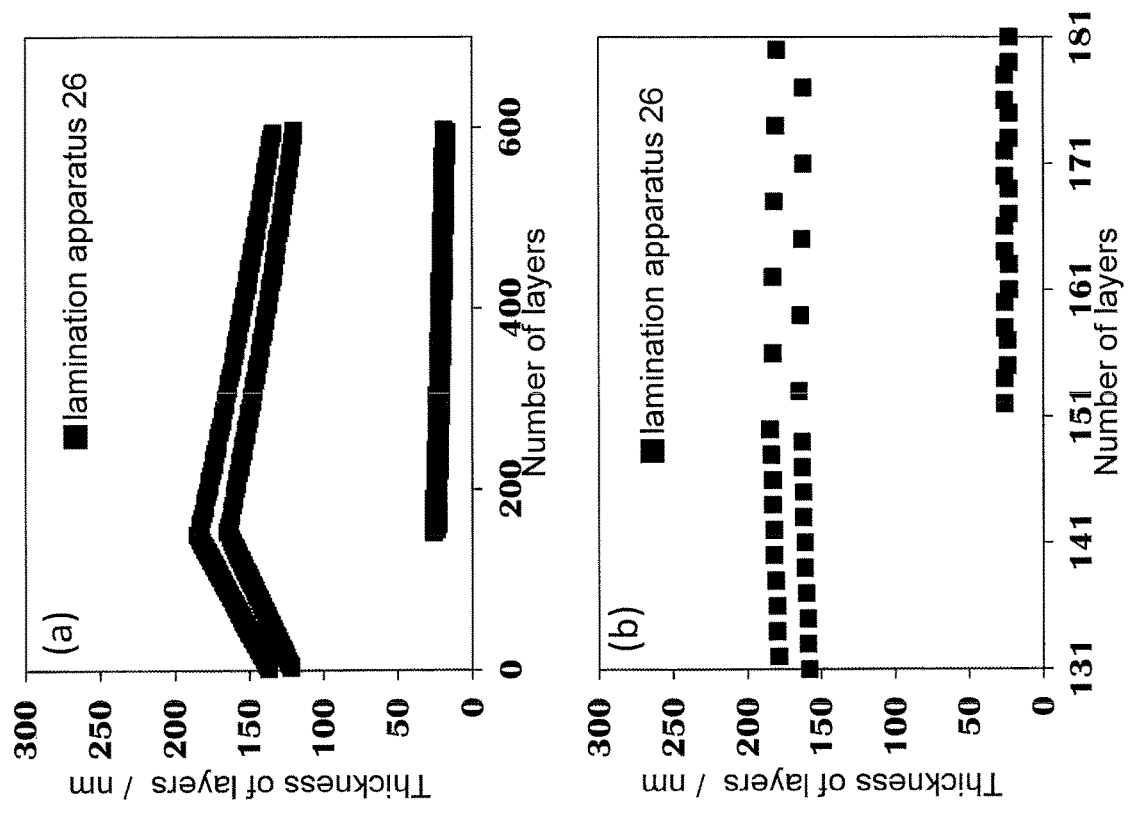
FIG. 12 (a) shows the distribution of the total thickness of the film observed when lamination apparatus 26 was used and (b) shows an enlarged view for layers 131 to 181.

The apparatus used (lamination apparatus 26) was similar to lamination apparatus 16 but configured to produce a film having a layer thickness distribution as shown in FIG. 12 (the layer thickness in lamination unit 1 increases from near the surface toward the center whereas the layer thickness in lamination unit 2 increases from near the other surface toward the center). Except for this, the same procedure as in Example 15 was carried out. It was found that mutually adjacent two layers in lamination unit 1 had a thickness ratio of 0.89 to 1.11 whereas lamination unit 2 was such that in comparison to the thinnest layer (having a thickness ratio of 1) of mutually adjacent three layers, the other two layers had thickness ratios of 1 to 1.2 and 6.1 to 8.0, respectively.

Example 23

Figure 13:
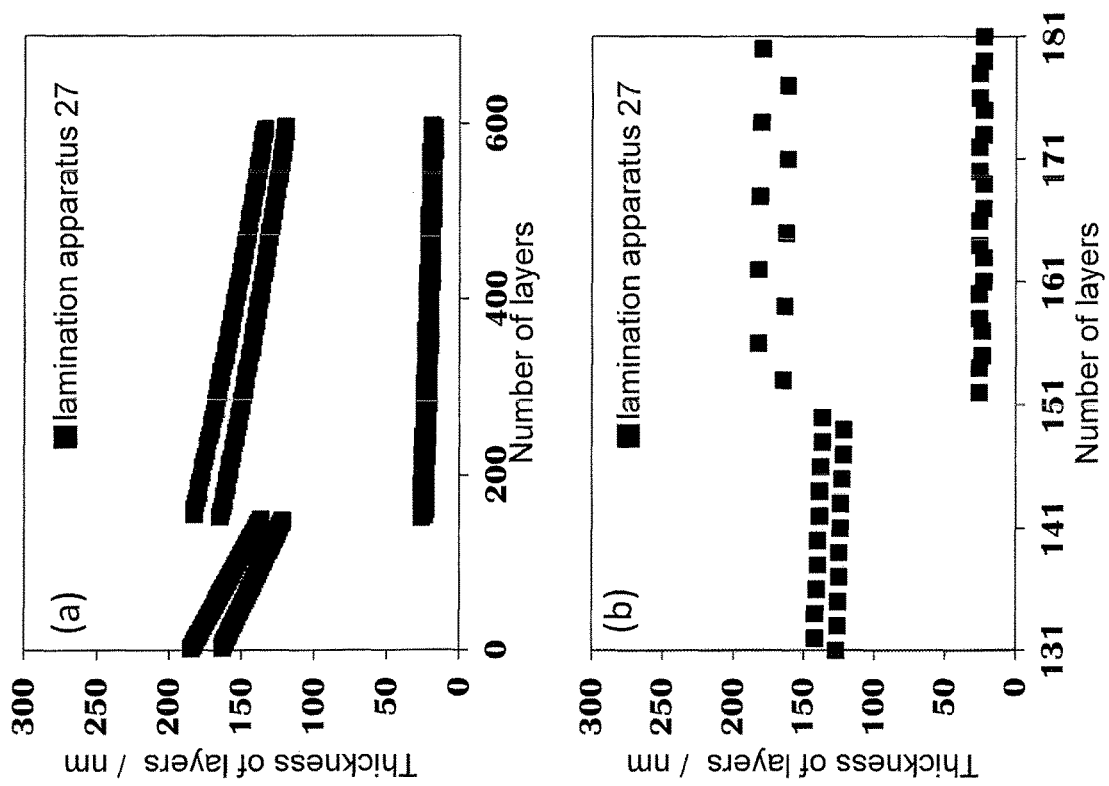
FIG. 13 (a) shows the distribution of the total thickness of the film observed when lamination apparatus 27 was used and (b) shows an enlarged view for layers 131 to 181.

The apparatus used (lamination apparatus 27) was similar to lamination apparatus 16 but configured to produce a film having a layer thickness distribution as shown in FIG. 13 (similar to Example 17, but only the layer thickness in lamination unit 1 decreases toward the center). Except for this, the same procedure as in Example 15 was carried out. It was found that mutually adjacent two layers in lamination unit 1 had a thickness ratio of 0.89 to 1.11 whereas lamination unit 2 was such that in comparison to the thinnest layer (having a thickness ratio of 1) of mutually adjacent three layers, the other two layers had thickness ratios of 1 to 1.2 and 6.1 to 8.0, respectively. As a result, the films obtained in Example 16, Example 22, and Example 23 showed nearly the same optical performance. It was found that if lamination unit 1 and lamination unit 2 both have a simply ascending or descending layer thickness distribution curve, they have almost identical optical characteristics.

Example 24

Figure 14:
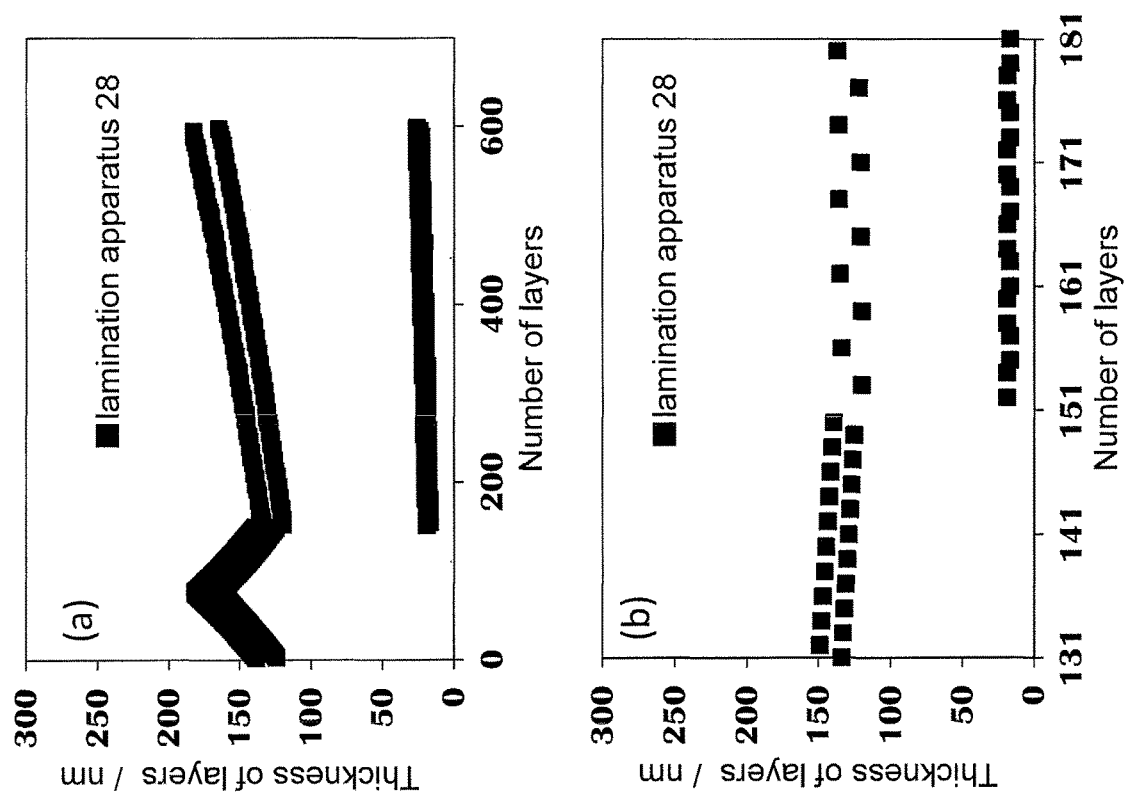
FIG. 14 (a) shows the distribution of the total thickness of the film observed when lamination apparatus 28 was used and (b) shows an enlarged view for layers 131 to 181.

The apparatus used (lamination apparatus 28) was similar to lamination apparatus 16 but configured to produce a film having a layer thickness distribution as shown in FIG. 14 (similar to Example 17, but the distribution curve in lamination unit 1 has a minimum). Except for this, the same procedure as in Example 17 was carried out. Here, excluding the thick layers, in lamination apparatus 29, mutually adjacent two layers in lamination unit 1 had a total thickness of 260 to 350 nm whereas mutually adjacent six layers in lamination unit 2 had a total thickness of 345 to 430 nm.

Example 25

Figure 15:
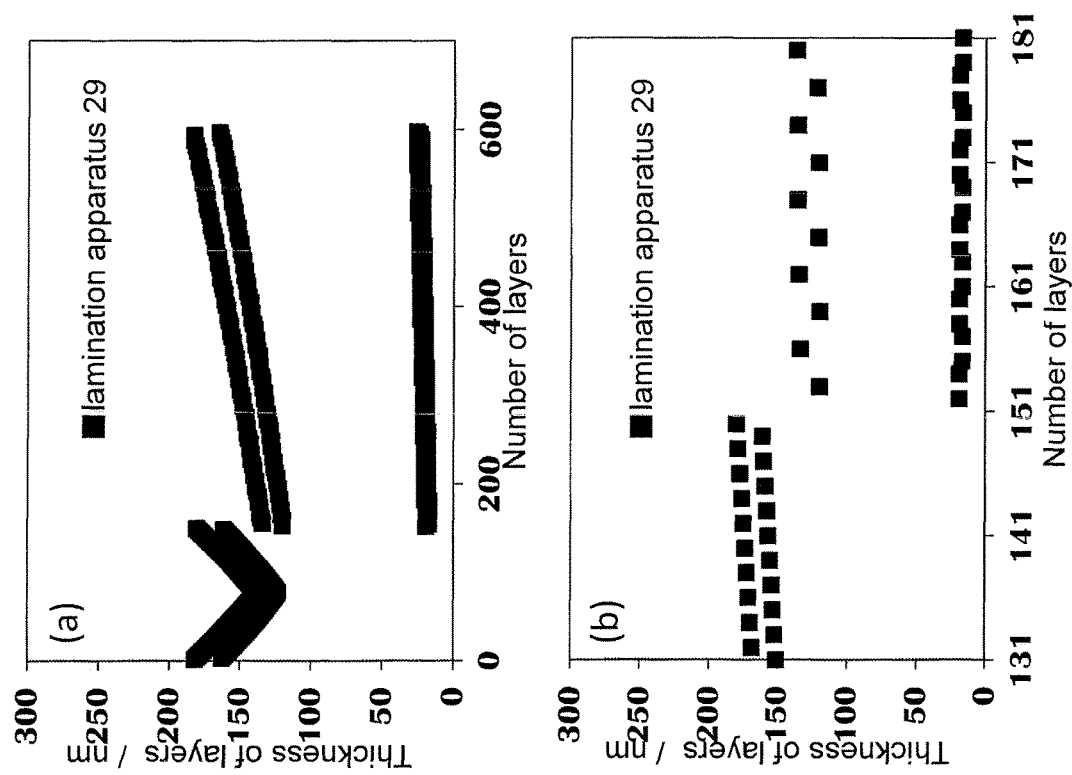
FIG. 15 (a) shows the distribution of the total thickness of the film observed when lamination apparatus 29 was used and (b) shows an enlarged view for layers 131 to 181.

The apparatus used (lamination apparatus 29) was similar to lamination apparatus 16 but configured to produce a film having a layer thickness distribution as shown in FIG. 15 (similar to Example 24, but the distribution curve in lamination unit 1 has a maximum). Except for this, the same procedure as in Example 5 was carried out. Here, excluding the thick layers, in lamination apparatus 30, mutually adjacent two layers in lamination unit 1 had a total thickness of 260 to 350 nm whereas mutually adjacent six layers in lamination unit 2 had a total thickness of 345 to 430 nm.

As a result, compared to Examples 22 and 23, the reflectance was slightly inferior in Examples 24 and 25, but the reflectance decreased in the wavelength range of 400 to 450 nm, resulting in a film more resistant to coloring. Furthermore, lamination unit 1 had a two stage constitution, resulting in a film suffering from less reflection loss in the length direction as well. Results are shown in Tables 5 to 8.

Example 26

Figure 16:
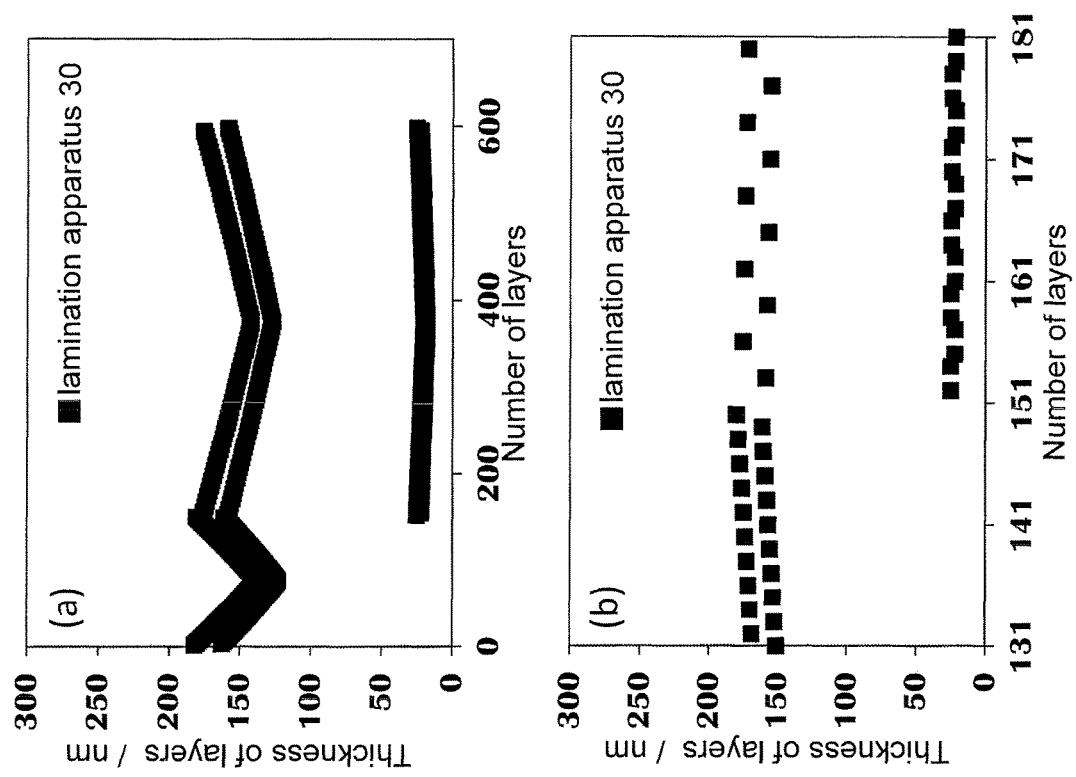
FIG. 16 (a) shows the distribution of the total thickness of the film observed when lamination apparatus 30 was used and (b) shows an enlarged view for layers 131 to 181.

The apparatus used (lamination apparatus 30) was similar to lamination apparatus 16 but configured to produce a film having a layer thickness distribution as shown in FIG. 16 (similar to Example 24, but the distribution curve in lamination unit also has a minimum). Except for this, the same procedure as in Example 17 was carried out.

Although the reflectance was slightly lower than in Example 23, sufficiently high heat ray shielding performance was maintained both in the infrared range and in the visible light range. The resulting film was the smallest in the unevenness in spectroscopic characteristics in the width direction. Results are shown in Tables 5 to 8.

Example 27

Figure 17:
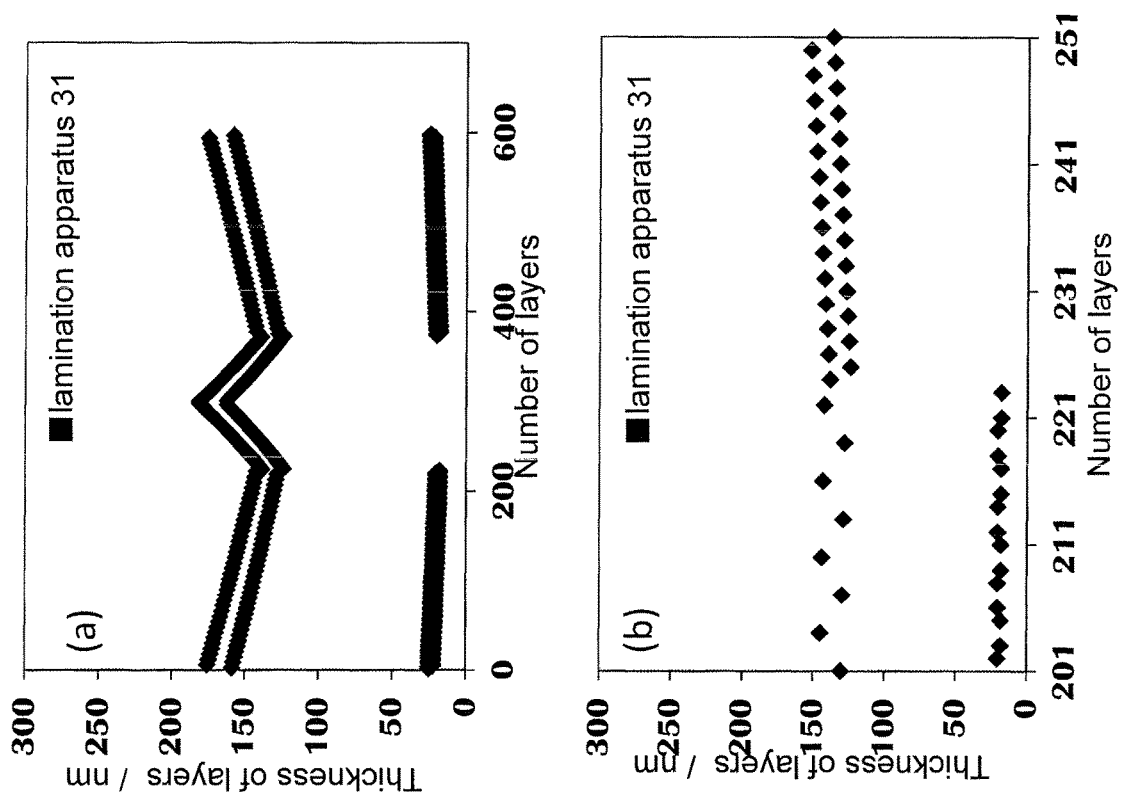
FIG. 17 (a) shows the distribution of the total thickness of the film observed when lamination apparatus 31 was used and (b) shows an enlarged view for layers 201 to 251.

The apparatus used (lamination apparatus 31) was similar to lamination apparatus 16 but configured to produce a film having a layer thickness distribution as shown in FIG. 17. Except for this, the same procedure as in Example 17 was carried out. However, since slit plate 1 and slit plate 2 were bilaterally symmetric, the thick surface layers (5 µm) and the thick intermediate layers (2.5 µm in both plates) had the same thicknesses.

As a result, the resulting film suffered from few flow marks and little spectroscopic unevenness in the width direction. Although slightly lower in heat ray shielding performance than in Example 17, it was possible to allow the two slit plates to have the same thickness, resulting in the smallest total film thickness. Results are shown in Tables 5 to 8.

Example 28

A hard coat layer was formed on the film prepared in Example 12. To prepare a coating to form a hard coat layer, DPHA (dipentaerythritol hexaacrylate) and a photo-initiator (IRGACURE (registered trademark) 184, manufactured by BASF Japan) were mixed at a weight ratio of 99:1 and MEK (methyl ethyl ketone) was added to adjust the solid content to 40% to provide coating material A. This coating material A was mixed with a slurry containing particles of cesium tungsten oxide $Cs0.33WO3$ at a solid content of 18.5 mass % to prepare a mixture at weight ratio of 2:7 to provide a coating material B to use for hard coat layer formation. This coating material was spread on one side of the base film using a wire bar coater, dried in a hot air oven at 80° C. for 2 minutes, and exposed to 300 $mJ/cm^2$ of ultraviolet ray from a UV irradiation apparatus to cure the coating film into a hard coat layer to provide a laminated film. The resulting hard coat layer had a thickness of 3.3 µm.

The resulting layered body had a high reflectance in the wavelength range of 900 to 1,400 nm and had a low transmittance. Results are shown in Table 9.

Example 29

Except for using the film prepared in Example 13, the same procedure as in Example 28 was carried out. The resulting layered body had a high reflectance in the wavelength range of 900 to 1,400 nm and had a low transmittance. Results are shown in Table 9.

Example 30

Except for using the film prepared in Example 14, the same procedure as in Example 28 was carried out. The resulting layered body had a high reflectance in the wavelength range of 900 to 1,400 nm and had a low transmittance. Results are shown in Table 9.

Example 31

Except for using the film prepared in Example 15, the same procedure as in Example 28 was carried out. The resulting layered body had a high reflectance in the wavelength range of 900 to 1,400 nm and had a low transmittance. Results are shown in Table 9.

Example 32

Except for using the film prepared in Example 16, the same procedure as in Example 28 was carried out. The resulting layered body had a high reflectance in the wavelength range of 900 to 1,400 nm and had a low transmittance. Results are shown in Table 9.

Example 33

Except for using the film prepared in Example 18, the same procedure as in Example 28 was carried out. The resulting layered body had a high reflectance in the wavelength range of 900 to 1,400 nm and had a low transmittance. Results are shown in Table 9.

Example 34

Except for using the film prepared in Example 19, the same procedure as in Example 28 was carried out. The resulting layered body had a high reflectance in the wavelength range of 900 to 1,400 nm and had a low transmittance. Results are shown in Table 9.

Example 35

Except for using the film prepared in Example 22, the same procedure as in Example 28 was carried out. The resulting layered body had a high reflectance in the wavelength range of 900 to 1,400 nm and had a low transmittance. Results are shown in Table 9.

Example 36

Except for forming a hard coat layer with a thickness of 2.5 µm, the same procedure as in Example 35 was carried out. The resulting layered body had a high reflectance in the wavelength range of 900 to 1,400 nm and had a low transmittance. Results are shown in Table 9.

Example 37

Except for forming a hard coat layer with a thickness of 1.7 µm, the same procedure as in Example 35 was carried out. The resulting layered body had a high reflectance in the wavelength range of 900 to 1,400 nm and had a low transmittance. Results are shown in Table 9.

Example 38

Except for using the film prepared in Example 4, the same procedure as in Example 28 was carried out. The resulting layered body had a high reflectance in the wavelength range of 900 to 1,800 nm and had a low transmittance. Results are shown in Table 9.

Example 39

Except for using the film prepared in Example 10, the same procedure as in Example 28 was carried out. The resulting layered body had a high reflectance in the wavelength range of 900 to 1,800 nm and had a low transmittance. Results are shown in Table 9.

Comparative Example 9

Except for using the film prepared in Comparative example 5, the same procedure as in Example 28 was carried out. The resulting layered body had a high reflectance in the wavelength range of 400 to 900 nm and accordingly, the formation of a hard coat layer designed to realize a transmittance in the visible range of 70% resulted in a decreased rate of solar radiation heat acquisition. Results are shown in Table 10.

Comparative Example 10

Except for using the film prepared in Comparative example 6, the same procedure as in Example 28 was carried out. The resulting layered body had a high reflectance in the wavelength range of 400 to 900 nm and accordingly, the formation of a hard coat layer designed to realize a transmittance in the visible range of 70% resulted in a decreased rate of solar radiation heat acquisition. Results are shown in Table 10.

Comparative Example 11

Except for using the film prepared in Comparative example 7, the same procedure as in Example 28 was carried out. The resulting layered body had a high reflectance in the wavelength range of 400 to 900 nm and accordingly, the formation of a hard coat layer designed to realize a transmittance in the visible range of 70% resulted in a decreased rate of solar radiation heat acquisition. Results are shown in Table 10.

Comparative Example 12

Except for forming a thinner hard coat layer, the same procedure as in Example 36 was carried out. The resulting layered body had a low transmittance in the wavelength range of 900 to 1,200 nm and had a decreased rate of solar radiation heat acquisition. Low in pencil hardness, furthermore, it was liable to flaws and poor in quality. Results are shown in Table 10.

Comparative Example 13

The coating material used to form a hard coat layer (coating material A') had a solid content that was one-third that of coating material A. Except for this, the same procedure as in Example 36 was carried out. The resulting layered body had a low transmittance in the wavelength range of 900 to 1,200 nm and had a decreased rate of solar radiation heat acquisition. Results are shown in Table 10.

Comparative Example 14

Particles of tin doped indium oxide (ITO) were used instead of cesium tungsten oxide (coating material B) and the hard coat layer formed was designed to realize a transmittance in the visible range of 75%. Except for this, the same procedure as in Example 36 was carried out. The resulting layered body had a low transmittance in the wavelength range of 900 to 1,200 nm and had a decreased rate of solar radiation heat acquisition. Results are shown in Table 10.

Comparative Example 15

Except for forming a hard coat layer designed to realize a transmittance in the visible range of 70%, the same procedure as in Comparative example 14 was carried out. The resulting layered body had a low transmittance in the wavelength range of 900 to 1,200 nm and had a decreased rate of solar radiation heat acquisition. Results are shown in Table 10.

Comparative Example 16

Particles of antimony doped tin oxide (ATO) were used instead of cesium tungsten oxide (coating material C) and the hard coat layer formed was designed to realize a transmittance in the visible range of 75%. Except for this, the same procedure as in Example 36 was carried out. The resulting layered body had a low transmittance in the wavelength range of 900 to 1,200 nm and had a decreased rate of solar radiation heat acquisition. Results are shown in Table 10.

Comparative Example 17

Except for forming a hard coat layer designed to realize a transmittance in the visible range of 70%, the same procedure as in Comparative example 9 was carried out. The resulting layered body had a low transmittance in the wavelength range of 900 to 1,200 nm and had a decreased rate of solar radiation heat acquisition. Results are shown in Table 10.

Comparative Example 18

Except for forming a single-layer base film using polyethylene terephthalate (manufactured by Toray Industries, Inc.: IV 0.65, Tg 79° C., Tm 255° C.) as thermoplastic resins A and B, the same procedure as in Example 36 was carried out. The resulting layered body was unable to reflect light in the wavelength range of 900 to 1,200 nm and had a decreased rate of solar radiation heat acquisition. Results are shown in Table 10.

Comparative Example 19

Except for forming a hard coat layer designed to realize a transmittance in the visible range of 75%, the same procedure as in Comparative example 18 was carried out. The resulting layered body was unable to reflect light in the wavelength range of 900 to 1,200 nm and had a decreased rate of solar radiation heat acquisition. Results are shown in Table 10.

Comparative Example 20

Except for forming a hard coat layer designed to realize a transmittance in the visible range of 80%, the same procedure as in Comparative example 18 was carried out. The resulting layered body was unable to reflect light in the wavelength range of 900 to 1,200 nm and had a decreased rate of solar radiation heat acquisition. Results are shown in Table 10.

TABLE 1

|  | Resin components | | | | Lamination apparatus | Total number of stacked layers |
| --- | --- | --- | --- | --- | --- | --- |
|  | layer A | layer B | layer C | layer D | | |
| Comparative example 1 | PEN | PETG resin | — | — | 1 | 225 |
| Example 1 | — | — | PEN | PETG resin | 2 | 657 |
| Comparative example 2 | — | — | PEN | PETG resin | — | 1313 |
| Example 2 | PEN | PETG resin | PEN | PETG resin | 3 | 449 |
| Example 3 | PEN | PETG resin | PEN | PETG resin | 4 | 599 |
| Example 4 | PEN | PETG resin | PEN | PETG resin | 5 | 747 |
| Example 5 | PEN | PETG resin | PEN | PETG resin | 6 | 867 |
| Example 6 | PEN | PETG resin | PEN | PETG resin | 7 | 867 |
| Example 7 | PEN | PETG resin | PEN | PETG resin | 8 | 335 |
| Comparative example 3 | PEN | PETG resin | PEN | PETG resin | 9 | 151 |
| Example 8 | PEN | PETG resin | PEN | PETG resin | 10 | 703 |
| Example 9 | PEN/NPG | PETG | PEN/NPG | PETG | 7 | 867 |
| Example 10 | PEN/NPG + PBT resin | SPG resin | PEN/NPG + PBT resin | SPG resin | 7 | 867 |
| Example 11 | PET | SPG resin | PET | SPG resin | 7 | 867 |

TABLE 2

|  | Lamination unit 1 | | | | | Lamination unit 2 | | | |
| --- | --- | --- | --- | --- | --- | --- | --- | --- | --- |
|  | number of layers | lamination ratio (A/B) | total thickness μm | minimum single layer thickness nm | maximum single layer thickness nm | number of layers | lamination ratio | total thickness μm | minimum thin layer thickness nm |
| Comparative example 1 | 222 | 0.9 | 46 | 125 | 299 | — | — | — | — |
| Example 1 | — | — | — | — | — | 654 | 1:7:1 | 44 | 13 |
| Comparative example 2 | — | — | — | — | — | — | — | — | — |
| Example 2 | 149 | 0.9 | 23 | 120 | 192 | 297 | 1:7:1 | 21 | 17 |
| Example 3 | 149 | 0.9 | 23 | 120 | 192 | 357 | 1:7:1 | 25 | 17 |
| Example 4 | 149 | 0.9 | 23 | 120 | 192 | 594 | 1:7:1 | 43 | 17 |
| Example 5 | 149 | 0.9 | 23 | 120 | 192 | 714 | 1:7:1 | 55 | 17 |
| Example 6 | 149 | 0.9 | 23 | 120 | 192 | 714 | 1:7:1 | 52 | 17 |
| Example 7 | 149 | 0.9 | 23 | 120 | 192 | 183 | 1:7:1 | 13 | 17 |
| Comparative example 3 | 149 | 0.9 | 23 | 120 | 192 | — | — | — | — |
| Example 8 | 46 | 0.9 | 7 | 124 | 183 | 654 | 1:7:1 | 44 | 13 |
| Example 9 | 149 | 0.9 | 23 | 120 | 192 | 714 | 1:7:1 | 52 | 17 |
| Example 10 | 149 | 0.9 | 23 | 120 | 192 | 714 | 1:7:1 | 52 | 17 |
| Example 11 | 149 | 0.9 | 23 | 120 | 192 | 714 | 1:7:1 | 52 | 17 |

TABLE 2-continued

|  | Lamination unit 2 maximum thin layer thickness nm | Thick surface layer | | Thick intermediate layer 1 | | Thick intermediate layer 2 | |
|---|---|---|---|---|---|---|---|
|  |  | plate 1 μm | plate 2 or 3 μm | plate 1 μm | plate 2 μm | plate 2 μm | plate 3 μm |
| Comparative example 1 | — | 7 | 3 | 3.5 | 1.5 | — | — |
| Example 1 | 34 | 7 | 3 | 3.5 | 1.5 | — | — |
| Comparative example 2 | — | — | — | — | — | — | — |
| Example 2 | 33 | 5 | 5 | 3 | 2 | — | — |
| Example 3 | 33 | 6 | 4 | 3 | 2 | — | — |
| Example 4 | 33 | 4 | 6 | 1.5 | 3.5 | 3.5 | 1.5 |
| Example 5 | 33 | 5 | 5 | 3 | 2 | 3 | 2 |
| Example 6 | 33 | 5 | 5 | 3 | 2 | 3 | 2 |
| Example 7 | 33 | 2 | 8 | 1 | 4 | — | — |
| Comparative example 3 | — | 2 | — | 1 | — | — | — |
| Example 8 | 34 | 7 | 3 | 3.5 | 1.5 | — | — |
| Example 9 | 33 | 5 | 5 | 3 | 2 | 3 | 2 |
| Example 10 | 33 | 5 | 5 | 3 | 2 | 3 | 2 |
| Example 11 | 33 | 5 | 5 | 3 | 2 | 3 | 2 |

TABLE 3

|  | Physical properties of film | | | | | | |
|---|---|---|---|---|---|---|---|
|  | film thickness μm | average Young's modulus GPa | axial rigidity N/m | $d_1/(d_1+d_2)$ | Flow mark | Spectroscopic unevenness in width direction | Suitability for pasting on curved glass |
| Comparative example 1 | 61 | 3.8 | 23 | 1 | ○ | ○ | ○ |
| Example 1 | 59 | 3.8 | 22 | 0 | ○ | ○ | ○ |
| Comparative example 2 | 120 | 3.8 | 46 | 0 | ○ | ○ | x |
| Example 2 | 59 | 3.8 | 22 | 0.52 | ○ | ○ | ○ |
| Example 3 | 63 | 3.8 | 24 | 0.47 | ○ | ○ | ○ |
| Example 4 | 86 | 3.8 | 33 | 0.35 | ○ | ○ | ○ |
| Example 5 | 99 | 3.8 | 38 | 0.29 | ○ | ○ | ○ |
| Example 6 | 95 | 3.8 | 36 | 0.30 | ○ | ○ | ○ |
| Example 7 | 51 | 3.8 | 19 | 0.63 | ○ | ○ | ○ |
| Comparative example 3 | 26 | 3.8 | 9.8 | 1 | Δ | Δ | x |
| Example 8 | 68 | 3.8 | 26 | 0.14 | Δ | Δ | ○ |
| Example 9 | 95 | 2.6 | 25 | 0.30 | ○ | ○ | ○ |
| Example 10 | 95 | 2.4 | 25 | 0.30 | ○ | ○ | ○ |
| Example 11 | 95 | 3.3 | 31 | 0.30 | ○ | ○ | ○ |

TABLE 4

|  | 430-600 nm | 400-800 nm | 1,200-1,800 nm | | | 900-1,200 nm | 900-1,800 nm | visible | rate of solar |
|---|---|---|---|---|---|---|---|---|---|
|  | average transmittance % | average transmittance % | average reflectance % | reflection band of 30% or more nm | reflection band of 50% or more nm | reflection band of 70% or more nm | average reflectance % | average reflectance % | light reflectance % | radiation heat acquisition % |
| Comparative example 1 | 41 | 67 | 78 | 600 | 485 | 239 | 68 | 75 | 42 | 53 |
| Example 1 | 92 | 90 | 67 | 600 | 461 | 60 | 60 | 65 | 9 | 72 |
| Comparative example 2 | 89 | 88 | 82 | 600 | 600 | 406 | 76 | 80 | 11 | 64 |
| Example 2 | 93 | 91 | 49 | 280 | 68 | 24 | 87 | 62 | 8 | 66 |
| Example 3 | 93 | 91 | 54 | 535 | 80 | 21 | 87 | 66 | 8 | 64 |
| Example 4 | 91 | 90 | 73 | 600 | 505 | 48 | 89 | 73 | 9 | 62 |

TABLE 4-continued

|  | 430-600 nm average transmittance % | 400-800 nm average transmittance % | 1,200-1,800 nm average reflectance % | 1,200-1,800 nm reflection band of 30% or more nm | 1,200-1,800 nm reflection band of 50% or more nm | 1,200-1,800 nm reflection band of 70% or more nm | 900-1,200 nm average reflectance % | 900-1,800 nm average reflectance % | visible light reflectance % | rate of solar radiation heat acquisition % |
|---|---|---|---|---|---|---|---|---|---|---|
| Example 5 | 92 | 90 | 80 | 589 | 562 | 180 | 90 | 80 | 9 | 61 |
| Example 6 | 92 | 91 | 82 | 598 | 576 | 170 | 90 | 82 | 8 | 61 |
| Example 7 | 93 | 91 | 34 | 199 | 20 | 0 | 85 | 59 | 9 | 68 |
| Comparative example 3 | 93 | 91 | 12 | 0 | 0 | 0 | 82 | 35 | 9 | 71 |
| Example 8 | 92 | 91 | 67 | 593 | 294 | 69 | 70 | 68 | 9 | 69 |
| Example 9 | 92 | 91 | 84 | 600 | 577 | 343 | 94 | 87 | 9 | 58 |
| Example 10 | 92 | 91 | 84 | 600 | 577 | 343 | 94 | 88 | 9 | 57 |
| Example 11 | 92 | 91 | 54 | 523 | 80 | 33 | 68 | 59 | 9 | 70 |

TABLE 5

|  | Resin components | | | | Lamination apparatus | Total number of stacked layers |
|---|---|---|---|---|---|---|
|  | layer A | layer B | layer C | layer D | | |
| Example 12 | PEN | PETG resin | PEN | PETG resin | 11 | 295 |
| Example 13 | PEN | PETG resin | PEN | PETG resin | 12 | 311 |
| Example 14 | PEN | PETG resin | PEN | PETG resin | 13 | 335 |
| Example 15 | PEN | PETG resin | PEN | PETG resin | 14 | 197 |
| Example 16 | PEN | PETG resin | PEN | PETG resin | 15 | 399 |
| Example 17 | PEN | PETG resin | PEN | PETG resin | 16 | 599 |
| Comparative example 4 | PEN | PETG resin | PEN | PETG resin | 17 | 399 |
| Example 18 | PEN | PETG resin | PEN | PETG resin | 18 | 399 |
| Example 19 | PEN | PETG resin | PEN | PETG resin | 19 | 399 |
| Comparative example 5 | PEN | PETG resin | PEN | PETG resin | 20 | 399 |
| Example 20 | PEN | PETG resin | PEN | PETG resin | 21 | 399 |
| Comparative example 6 | PEN | PETG resin | PEN | PETG resin | 22 | 399 |
| Comparative example 7 | PEN | PETG resin | PEN | PETG resin | 23 | 399 |
| Example 21 | PEN | PETG resin | PEN | PETG resin | 24 | 599 |
| Comparative example 8 | PEN | PETG resin | PEN | PETG resin | 25 | 599 |
| Example 22 | PEN | PETG resin | PEN | PETG resin | 26 | 599 |
| Example 23 | PEN | PETG resin | PEN | PETG resin | 27 | 599 |
| Example 24 | PEN | PETG resin | PEN | PETG resin | 28 | 599 |
| Example 25 | PEN | PETG resin | PEN | PETG resin | 29 | 599 |
| Example 26 | PEN | PETG resin | PEN | PETG resin | 30 | 599 |
| Example 27 | PEN | PETG resin | PEN | PETG resin | 31 | 599 |

TABLE 6

|  | Lamination unit 1 | | | | | Lamination unit 2 | | | |
|---|---|---|---|---|---|---|---|---|---|
|  | number of layers | lamination ratio (A/B) | total thickness μm | minimum single layer thickness nm | maximum single layer thickness nm | number of layers | lamination ratio | total thickness μm | minimum thin layer thickness nm |
| Example 12 | 73 | 0.9 | 11 | 124 | 182 | 219 | 1:7:1 | 14 | 18 |
| Example 13 | 53 | 0.9 | 8 | 124 | 182 | 255 | 1:7:1 | 17 | 18 |
| Example 14 | 35 | 0.9 | 5 | 124 | 182 | 297 | 1:7:1 | 20 | 18 |
| Example 15 | 149 | 0.9 | 22 | 124 | 182 | 45 | 1:7:1 | 3 | 18 |
| Example 16 | 99 | 0.9 | 15 | 124 | 182 | 297 | 1:7:1 | 20 | 18 |
| Example 17 | 149 | 0.9 | 22 | 124 | 182 | 447 | 1:7:1 | 29 | 18 |
| Comparative example 4 | 99 | 0.9 | 15 | 124 | 182 | 297 | 1:5:1 | 20 | 22 |

TABLE 6-continued

| | | | | | | | | | |
|---|---|---|---|---|---|---|---|---|---|
| Example 18 | 99 | 0.9 | 15 | 124 | 182 | 297 | 1:6:1 | 20 | 19 |
| Example 19 | 99 | 0.9 | 15 | 124 | 182 | 297 | 1:8:1 | 20 | 15 |
| Comparative example 5 | 99 | 0.9 | 15 | 124 | 182 | 297 | 1:9:1 | 20 | 13 |
| Example 20 | 99 | 0.9 | 15 | 124 | 182 | 297 | 1:7:1.3 | 20 | 17 |
| Comparative example 6 | 99 | 0.9 | 15 | 124 | 182 | 297 | 1:7:1.4 | 20 | 17 |
| Comparative example 7 | 99 | 0.65 | 15 | 103 | 208 | 297 | 1:7:1 | 20 | 18 |
| Example 21 | 149 | 0.9 | 22 | 124 | 182 | 447 | 1:7:1 | 29 | 18 |
| Comparative example 8 | 149 | 0.9 | 22 | 124 | 182 | 447 | 1:7:1 | 29 | 18 |
| Example 22 | 149 | 0.9 | 22 | 124 | 182 | 447 | 1:7:1 | 29 | 18 |
| Example 23 | 149 | 0.9 | 22 | 124 | 182 | 447 | 1:7:1 | 29 | 18 |
| Example 24 | 149 | 0.9 | 22 | 124 | 182 | 447 | 1:7:1 | 29 | 18 |
| Example 25 | 149 | 0.9 | 22 | 124 | 182 | 447 | 1:7:1 | 29 | 18 |
| Example 26 | 149 | 0.9 | 22 | 124 | 182 | 447 | 1:7:1 | 29 | 18 |
| Example 27 | 149 | 0.9 | 22 | 124 | 182 | 447 | 1:7:1 | 29 | 18 |

| | Lamination unit 2 maximum thin layer thickness nm | Thick surface layer | | Thick intermediate layer 1 | |
|---|---|---|---|---|---|
| | | plate 1 μm | plate 2 μm | plate 1 μm | plate 2 μm |
| Example 12 | 25 | 5 | 5 | 4 | 1 |
| Example 13 | 25 | 8 | 2 | 4 | 1 |
| Example 14 | 25 | 8 | 2 | 4 | 1 |
| Example 15 | 25 | 2 | 8 | 4 | 1 |
| Example 16 | 25 | 6 | 4 | 4 | 1 |
| Example 17 | 25 | 8 | 4 | 4 | 1 |
| Comparative example 4 | 35 | 6 | 4 | 4 | 1 |
| Example 18 | 30 | 6 | 4 | 4 | 1 |
| Example 19 | 22 | 6 | 4 | 4 | 1 |
| Comparative example 5 | 20 | 6 | 4 | 4 | 1 |
| Example 20 | 33 | 6 | 4 | 4 | 1 |
| Comparative example 6 | 36 | 6 | 4 | 4 | 1 |
| Comparative example 7 | 25 | 6 | 4 | 4 | 1 |
| Example 21 | 25 | 0.5 | 0.5 | 8 | 1 |
| Comparative example 8 | 25 | 12 | 5 | 0.5 | 0.5 |
| Example 22 | 25 | 8 | 4 | 4 | 1 |
| Example 23 | 25 | 8 | 4 | 4 | 1 |
| Example 24 | 25 | 8 | 4 | 4 | 1 |
| Example 25 | 25 | 8 | 4 | 4 | 1 |
| Example 26 | 25 | 8 | 4 | 4 | 1 |
| Example 27 | 25 | 5 | 5 | 2.5 | 2.5 |

TABLE 7

| | film thickness μm | average Young's modulus GPa | axial rigidity N/m | $d_1/(d_1 + d_2)$ | flow mark | spectroscopic unevenness in width direction | suitability for pasting on curved glass |
|---|---|---|---|---|---|---|---|
| Example 12 | 40 | 3.8 | 15 | 0.44 | ○ | ○ | ○ |
| Example 13 | 40 | 3.8 | 15 | 0.32 | Δ | ○ | ○ |
| Example 14 | 40 | 3.8 | 15 | 0.20 | Δ | ○ | ○ |
| Example 15 | 40 | 3.8 | 15 | 0.88 | Δ | ○ | ○ |
| Example 16 | 50 | 3.8 | 19 | 0.43 | ○ | ○ | ○ |
| Example 17 | 68 | 3.8 | 26 | 0.43 | ○ | ○ | ○ |
| Comparative example 4 | 50 | 3.8 | 19 | 0.43 | ○ | ○ | ○ |
| Example 18 | 50 | 3.8 | 19 | 0.43 | ○ | ○ | ○ |
| Example 19 | 50 | 3.8 | 19 | 0.43 | ○ | ○ | ○ |
| Comparative example 5 | 50 | 3.8 | 19 | 0.43 | ○ | ○ | ○ |
| Example 20 | 50 | 3.8 | 19 | 0.43 | ○ | ○ | ○ |
| Comparative example 6 | 50 | 3.8 | 19 | 0.43 | ○ | ○ | ○ |

TABLE 7-continued

|  | film thickness μm | average Young's modulus GPa | axial rigidity N/m | d1/(d1 + d2) | flow mark | spectroscopic unevenness in width direction | suitability for pasting on curved glass |
|---|---|---|---|---|---|---|---|
| Comparative example 7 | 50 | 3.8 | 19 | 0.43 | ○ | ○ | ○ |
| Example 21 | 61 | 3.8 | 23 | 0.43 | Δ | x | ○ |
| Comparative example 8 | 69 | 3.8 | 26 | 0.43 | x | ○ | ○ |
| Example 22 | 68 | 3.8 | 26 | 0.43 | ○ | ○ | ○ |
| Example 23 | 68 | 3.8 | 26 | 0.43 | ○ | ○ | ○ |
| Example 24 | 68 | 3.8 | 26 | 0.43 | ○ | ○ | ○ |
| Example 25 | 68 | 3.8 | 26 | 0.43 | ○ | ○ | ○ |
| Example 26 | 68 | 3.8 | 26 | 0.43 | ○ | ○ | ○ |
| Example 27 | 66 | 3.8 | 25 | 0.43 | ○ | ○ | ○ |

TABLE 8

|  | 430-600 nm average transmittance % | 400-800 nm average transmittance % | 1,200-1,800 nm average reflectance % | 1,200-1,800 nm reflection band of 30% or more nm | 1,200-1,800 nm reflection band of 50% or more nm | 1,200-1,800 nm reflection band of 70% or more nm | 900-1,200 nm average reflectance % | 900-1400 nm average reflectance % | 900-1,800 nm average reflectance % | visible light reflectance % | rate of solar radiation heat acquisition % |
|---|---|---|---|---|---|---|---|---|---|---|---|
| Example 12 | 96 | 95 | 28 | 245 | 190 | — | 70 | 68 | 42 | 8 | 75 |
| Example 13 | 96 | 95 | 30 | 245 | 190 | 168 | 63 | 66 | 41 | 8 | 78 |
| Example 14 | 96 | 95 | 32 | 245 | 190 | 169 | 36 | 52 | 33 | 9 | 85 |
| Example 15 | 94 | 92 | 17 | 50 | — | — | 79 | 58 | 38 | 8 | 71 |
| Example 16 | 96 | 94 | 39 | 279 | 219 | — | 90 | 76 | 56 | 9 | 72 |
| Example 17 | 94 | 92 | 42 | 286 | 259 | 239 | 91 | 87 | 58 | 9 | 68 |
| Comparative example 4 | 94 | 93 | 36 | 354 | 213 | — | 78 | 69 | 50 | 23 | 58 |
| Example 18 | 95 | 94 | 29 | 300 | 258 | — | 81 | 74 | 47 | 11 | 65 |
| Example 19 | 94 | 93 | 27 | 278 | 243 | — | 81 | 75 | 45 | 10 | 66 |
| Comparative example 5 | 93 | 93 | 37 | 179 | 141 | — | 78 | 74 | 51 | 10 | 65 |
| Example 20 | 91 | 92 | 38 | 313 | 272 | — | 77 | 74 | 51 | 11 | 65 |
| Comparative example 6 | 94 | 92 | 42 | 313 | 272 | — | 91 | 73 | 58 | 13 | 63 |
| Comparative example 7 | 80 | 36 | 36 | 279 | 219 | — | 80 | 75 | 51 | 19 | 68 |
| Example 21 | 96 | 94 | 39 | 283 | 270 | 249 | 90 | 87 | 56 | 8 | 66 |
| Comparative example 8 | — | — | — | — | — | — | — | — | — | — | — |
| Example 22 | 96 | 94 | 39 | 263 | 243 | 227 | 88 | 87 | 55 | 8 | 68 |
| Example 23 | 96 | 95 | 39 | 263 | 243 | 227 | 88 | 87 | 55 | 8 | 68 |
| Example 24 | 96 | 95 | 39 | 263 | 243 | 227 | 86 | 86 | 55 | 8 | 70 |
| Example 25 | 91 | 94 | 37 | 263 | 243 | 227 | 78 | 84 | 51 | 8 | 69 |
| Example 26 | 94 | 94 | 38 | 233 | 194 | 102 | 77 | 85 | 51 | 8 | 69 |
| Example 27 | 92 | 95 | 34 | 233 | 194 | 102 | 81 | 84 | 50 | 8 | 70 |

TABLE 9

|  | Base material lamination apparatus | Base material total number of layers | Base material film thickness μm | Hard coat layer type | Hard coat layer thickness μm | Hard coat layer pencil hardness | band (400-900 nm) average reflectance % | band (900-1,200 nm) average reflectance % | band (900-1400 nm) average reflectance % | band (400-900 nm) average transmittance % | band (900-1400 nm) average transmittance % | light transmittance in visible range % | rate of solar radiation heat acquisition % |
|---|---|---|---|---|---|---|---|---|---|---|---|---|---|
| Example 28 | 11 | 295 | 40 | coating material A | 3.3 | H | 8 | 70 | 68 | 44 | 0.4 | 70 | 43 |

TABLE 9-continued

| | Base material | | | Hard coat layer | | band (400-900 nm) | band (900-1,200 nm) | band (900-1400 nm) | band (400-900 nm) | band (900-1400 nm) | light transmittance | rate of solar radiation |
|---|---|---|---|---|---|---|---|---|---|---|---|---|
| | lamination apparatus | total number of layers | film thickness μm | type | thickness μm | pencil hardness | average reflectance % | average reflectance % | average reflectance % | average transmittance % | average transmittance % | in visible range % | heat acquisition % |
| Example 29 | 12 | 311 | 40 | coating material A | 3.3 | H | 8 | 63 | 66 | 44 | 0.4 | 70 | 44 |
| Example 30 | 13 | 335 | 40 | coating material A | 3.3 | H | 8 | 36 | 52 | 44 | 0.4 | 70 | 46 |
| Example 31 | 14 | 197 | 40 | coating material A | 3.3 | H | 8 | 80 | 58 | 44 | 0.4 | 70 | 45 |
| Example 32 | 15 | 399 | 50 | coating material A | 3.3 | H | 8 | 80 | 76 | 44 | 0.4 | 70 | 42 |
| Example 33 | 16 | 399 | 50 | coating material A | 3.3 | H | 10 | 78 | 74 | 45 | 0.6 | 70 | 43 |
| Example 34 | 18 | 399 | 50 | coating material A | 3.3 | H | 9 | 81 | 75 | 44 | 0.4 | 70 | 43 |
| Example 35 | 22 | 599 | 68 | coating material A | 3.3 | H | 9 | 91 | 87 | 44 | 0.4 | 70 | 41 |
| Example 36 | 19 | 599 | 68 | coating material A | 2.5 | F | 9 | 91 | 87 | 50 | 0.9 | 75 | 45 |
| Example 37 | 19 | 599 | 68 | coating material A | 1.7 | F | 9 | 91 | 87 | 57 | 2.1 | 80 | 49 |
| Example 38 | 5 | 599 | 68 | coating material A | 1.7 | F | 9 | 89 | 80 | 48 | 2.1 | 70 | 41 |
| Example 39 | 7 | 599 | 68 | coating material A | 1.7 | F | 9 | 91 | 88 | 49 | 2.1 | 70 | 40 |

TABLE 10

| | Base material | | | Hard coat layer | | band (400-900 nm) | band (900-1,200 nm) | band (900-1400 nm) | band (400-900 nm) | band (900-1400 nm) | light transmittance | rate of solar radiation |
|---|---|---|---|---|---|---|---|---|---|---|---|---|
| | lamination apparatus | total number of layers | film thickness μm | type | thickness μm | pencil hardness | average reflectance % | average reflectance % | average reflectance % | average transmittance % | average transmittance % | in visible range % | heat acquisition % |
| Comparative example 9 | 17 | 399 | 20 | coating material A | 2.4 | F | 15 | 73 | 69 | 49 | 4.2 | 70 | 52 |
| Comparative example 10 | 20 | 399 | 20 | coating material A | 2.3 | F | 14 | 81 | 74 | 48 | 3.9 | 70 | 52 |
| Comparative example 11 | 23 | 399 | 20 | coating material A | 2.1 | F | 18 | 79 | 75 | 51 | 4.7 | 70 | 53 |
| Comparative example 12 | 19 | 599 | 29 | coating material A | 1.0 | HB | 9 | 91 | 87 | 66 | 4.1 | 85 | 54 |
| Comparative example 13 | 19 | 599 | 29 | coating material A' | 3.3 | H | 9 | 91 | 87 | 66 | 4.1 | 85 | 54 |
| Comparative example 14 | 19 | 599 | 29 | coating material B | 2.7 | F | 9 | 91 | 87 | 50 | 27.0 | 75 | 55 |

TABLE 10-continued

| | Base material | | | Hard coat layer | | band (400-900 nm) | band (900-1,200 nm) | band (900-1400 nm) | band (400-900 nm) | band (900-1400 nm) | light transmittance | rate of solar radiation |
|---|---|---|---|---|---|---|---|---|---|---|---|---|
| | lamination apparatus | total number of layers | film thickness µm | type | thickness µm | pencil hardness | average reflectance % | | | average transmittance % | in visible range % | heat acquisition % |
| | | | | | | | % | % | % | | | |
| Comparative example 15 | 19 | 599 | 29 | coating material B | 3.6 | F | 9 | 91 | 87 | 44 | 15.0 | 70 | 51 |
| Comparative example 16 | 19 | 599 | 29 | coating material C | 2.9 | F | 9 | 91 | 87 | 49 | 40.0 | 75 | 58 |
| Comparative example 17 | 19 | 599 | 29 | coating material C | 3.8 | H | 9 | 91 | 87 | 42 | 26.0 | 70 | 55 |
| Comparative example 18 | 19 | — | — | coating material A | 3.5 | H | 7 | 5 | 6 | 48 | 4.3 | 70 | 53 |
| Comparative example 19 | 19 | — | — | coating material A | 2.6 | F | 7 | 6 | 6 | 55 | 9.6 | 75 | 57 |
| Comparative example 20 | 19 | — | — | coating material A | 1.8 | F | 8 | 6 | 6 | 63 | 20.6 | 80 | 63 |

INDUSTRIAL APPLICABILITY

The laminated film according to the present invention is particularly high in transparency, able to reflect heat ray over a wide band, and useful for various applications including building materials, automobiles, and liquid crystal displays, and in particular, it can be used as optical film to reflect light in a specific wavelength range. Furthermore, it can be pasted on glass surfaces with high curvatures.

The invention claimed is:

1. A film having at least one reflection band where a reflectance of 30% or more is maintained over a continuous part covering 100 nm or more in a wavelength range of 1,200 to 1,800 nm for incident light entering at least from one side,
    wherein the film has an average transmittance of 70% or more over a wavelength range of 430 to 600 nm, and has an average axial rigidity between the main orientation axis direction of the film and the direction perpendicular thereto of 10 kN/m or more and 45 kN/m or less, wherein:
    the film has a lamination unit 1 in which layers (A-layers) containing a thermoplastic resin A as a primary component and layers (B-layers) containing a thermoplastic resin B as a primary component are stacked alternately to meet the requirement (i) described below; and
    the film has a lamination unit 2 in which layers (C-layers) containing a thermoplastic resin C as a primary component and layers (D-layers) containing a thermoplastic resin D as a primary component are stacked alternately to meet the requirement (ii) described below:
    (i) any A-layer and B-layer located adjacent to each other have a thickness ratio (thickness of A-layer/thickness of B-layer) of 0.7 or more and 1.4 or less;
    (ii) compared to the thinnest layer (having a thickness ratio of 1) of three layers located adjacent to each other, one of the other two layers has a thickness ratio of 1.0 or more and 1.4 or less whereas the remaining layer has a thickness ratio of 5 or more and 9 or less.

2. The film as set forth in claim 1, wherein the average transmittance in a wavelength range of 400 to 800 nm is 80% or more at least for incident light coming through either surface.

3. The film as set forth in claim 1, wherein the total thickness d1 of the lamination unit 1 is 5 µm or more.

4. The film as set forth in claim 1, wherein the total thickness d2 of the lamination unit 2 is 20 µm or more.

5. The film as set forth in claim 1, wherein the thermoplastic resins A and C are crystalline resins and the thermoplastic resins B and D are amorphous resins.

6. The film as set forth in claim 1, wherein in either the lamination unit 1 or the lamination unit 2, or both the lamination unit 1 and the lamination unit 2, the total layer thickness of continuously located six layers has a layer thickness distribution in the thickness direction of the film.

7. The film as set forth in claim 1, having a region in which the total layer thickness of mutually adjacent six layers in the lamination unit 1 decreases gradually from either surface toward the central portion.

8. The film as set forth in claim 1, having a region in which the total layer thickness of mutually adjacent six layers in the lamination unit 2 decreases gradually from either surface toward the central portion.

9. The film as set forth in claim 1, having a region in which the total layer thickness of mutually adjacent six layers in the lamination unit 1 decreases gradually from either surface toward the central portion, and having a region in which the total layer thickness of mutually adjacent six layers in the lamination unit 2 decreases gradually from either surface toward the central portion.

10. The film as set forth in claim 1, containing a layer having a layer thickness of 1 µm or more.

11. The film as set forth in claim 1, wherein the total thickness d1 (µm) of the lamination unit 1 and the total thickness d2 (µm) of the lamination unit 2 meet the equation (1) or (2) given below:

$$0.4 \leq d1/(d1+d2) < 1 \quad \text{equation (1)}$$

$$0.01 \leq d1/(d1+d2) < 0.4 \quad \text{equation (2)}.$$

12. The film as set forth in claim 1, wherein the film thickness is 100 μm or less.

13. The film as set forth in claim 10, wherein the average reflectance in the wavelength range of 900 to 1,400 nm is 70% or more at least for incident light coming through either surface.

14. The film as set forth in claim 1, wherein the average reflectance in the wavelength range of 900 nm to 1,800 nm is 70% or more at least for incident light coming through either surface.

15. A layered body containing the film as set forth in claim 1, a hard coat layer located in close proximity to at least either side thereof, and a sticking layer attached on the other side thereof.

16. A layered body having the film as set forth in claim 1 and a hard coat layer located in close proximity to at least either side thereof and having visible light transmittance of 70% or more and total solar energy transmittance of 50% or less as specified in ISO9050, wherein the hard coat layer contains a heat ray absorbent.

17. The layered body as set forth in claim 16, wherein the heat ray absorbent contains a tungsten oxide component.

18. The layered body as set forth in claim 16, wherein the hard coat layer has a thickness of 0.1 μm or more and 50 μm or less.

\* \* \* \* \*